(12) United States Patent
Su et al.

(10) Patent No.: US 12,004,148 B2
(45) Date of Patent: Jun. 4, 2024

(54) TRANSMISSION CONFIGURATION INDICATION METHOD OF DMRS PORT AND RELATED APPARATUS, AND STORAGE MEDIUM

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Runhua Chen, Beijing (CN); Mengjun Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 419 days.

(21) Appl. No.: 17/600,608

(22) PCT Filed: Feb. 7, 2020

(86) PCT No.: PCT/CN2020/074552
§ 371 (c)(1),
(2) Date: Oct. 1, 2021

(87) PCT Pub. No.: WO2020/199752
PCT Pub. Date: Oct. 8, 2020

(65) Prior Publication Data
US 2022/0201712 A1    Jun. 23, 2022

(30) Foreign Application Priority Data
Apr. 4, 2019  (CN) .......................... 201910272864.1

(51) Int. Cl.
*H04W 72/1263*    (2023.01)
*H04L 5/00*    (2006.01)
(Continued)

(52) U.S. Cl.
CPC ....... *H04W 72/1263* (2013.01); *H04L 5/0051* (2013.01); *H04L 27/2613* (2013.01); *H04W 72/23* (2023.01)

(58) Field of Classification Search
CPC .............. H04W 72/1263; H04W 72/23; H04L 5/0051; H04L 27/2613; H04L 5/0023; H04L 5/0094; H04L 5/0026; H04L 5/0048
See application file for complete search history.

(56) References Cited

U.S. PATENT DOCUMENTS

2019/0082335 A1    3/2019   Yu et al.
2020/0112411 A1*   4/2020   Khoshnevisan .... H04L 25/0204
(Continued)

FOREIGN PATENT DOCUMENTS

CN    106470087 A    3/2017
CN    108111283 A    6/2018
(Continued)

OTHER PUBLICATIONS

ZTE,"Enhancements on multi-TRP/Panel transmission", 3GPP TSG RAN WG1 #96, Athens, Greece, Feb. 25-Mar. 1, 2019, total 19 pages, R1-1901634.
(Continued)

*Primary Examiner* — Tejis Daya
(74) *Attorney, Agent, or Firm* — Kilpatrick Townsend & Stockton LLP

(57) ABSTRACT

Disclosed in the present application are a method for transmission configuration indication (TCI) of a DMRS port and a related apparatus, and a storage medium. In the method, a network side device configures at least two DMRS ports for a terminal according to the correspondence between required TCI states and DMRS CDM groups, the at least two DMRS ports belonging to different CDM groups, and the different CDM groups comprising different numbers of
(Continued)

DMRS ports; and sends DCI to the terminal, the DCI comprising a DMRS port index value, the DMRS port index value being an index value pre-defined in a DMRS port allocation table, and the DMRS port index value being used for indicating a DMRS port set allocated to the terminal, the number of CDM groups without data, and the number of preamble DMRS symbols, and being used for indicating the correspondence.

20 Claims, 6 Drawing Sheets

(51) Int. Cl.
    *H04L 27/26*         (2006.01)
    *H04W 72/23*       (2023.01)

(56) References Cited

U.S. PATENT DOCUMENTS

| | | | |
|---|---|---|---|
| 2020/0153543 A1* | 5/2020 | Khoshnevisan | H04L 27/261 |
| 2022/0167389 A1* | 5/2022 | Kim | H04L 1/08 |
| 2022/0173866 A1* | 6/2022 | Wang | H04J 13/0077 |

FOREIGN PATENT DOCUMENTS

| | | |
|---|---|---|
| CN | 108809609 A | 11/2018 |
| CN | 109391441 A | 2/2019 |
| WO | 2018129300 A1 | 7/2018 |
| WO | 2019050367 A1 | 3/2019 |

OTHER PUBLICATIONS

LG Electronics,"Discussion on DMRS port indication for NCJT", 3GPP TSG RAN WG1 #96bis, Xi'an, China, Apr. 8-12, 2019, total 9 pages, R1-1904214.

Ericsson,"On multi-TRP and multi-panel", 3GPP TSG RAN WG1 Meeting RAN1#96-bis, Xi'an, China, Apr. 8-12, 2019, total 18 pages, R1-1904750.

Huawei et al.,"Summary of AI: 7.2.8.2 Enhancements on Multi-TRP/Panel Transmission of Offline Discussion", 3GPP TSG RAN WG1 Meeting #96, Athens, Greece, Feb. 25-Mar. 1, 2019, total 8 pages, R1-190abcd.

Huawei et al.,"Single PDCCH based multi-TRP/panel transmission", 3GPP TSG RAN WGI Meeting #96, Athens, Greece, Feb. 25-Mar. 1, 2019, total 7 pages, R1-1903099.

CATT,"Consideration on multi-TRP/panel transmission", 3GPP TSG RAN WG1 #96bis, Xi'an, China, Apr. 8-12, 2019, total 14 pages, R1-1904561.

* cited by examiner

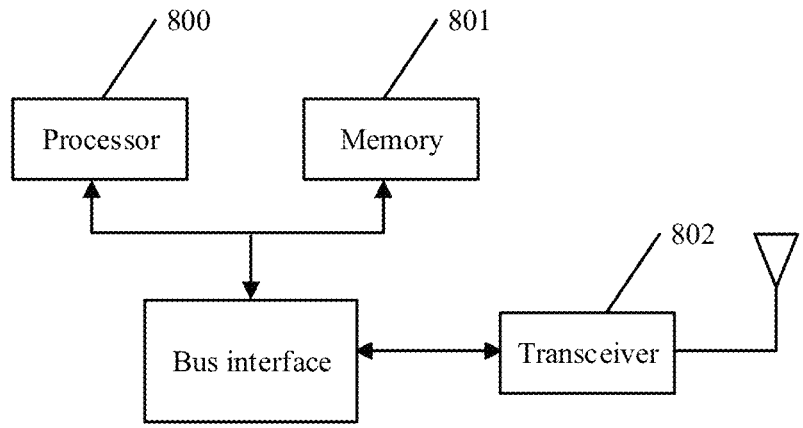

FIG. 3

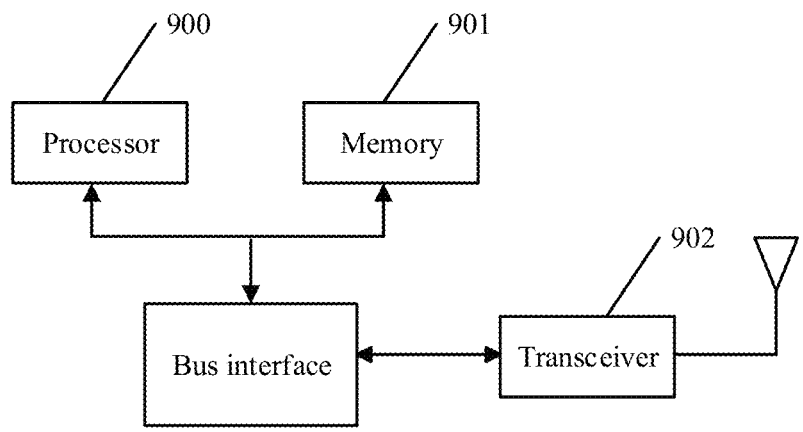

FIG. 4

| Configuring, by a network side device, at least two DMRS ports for a terminal according to a required mapping relationship between TCI states and DMRS CDM groups, wherein the at least two DMRS ports belong to different DMRS CDM groups, and the different DMRS CDM groups include different quantities of DMRS ports | 501 |

| Sending DCI to the terminal, wherein the DCI includes DMRS port index values, the DMRS port index values are index values pre-defined in a DMRS port allocation table, and the DMRS port index values are used to indicate a set of DMRS ports allocated to the terminal, the number of DMRS CDM groups without data, and a number of front-load DMRS symbols, and are used to indicate the mapping relationship between the TCI states and the DMRS CDM groups | 502 |

FIG. 5

TRANSMISSION CONFIGURATION INDICATION METHOD OF DMRS PORT AND RELATED APPARATUS, AND STORAGE MEDIUM

CROSS REFERENCE TO RELATED APPLICATIONS

The present application is a National Stage of International Application No. PCT/CN2020/074552, filed on Feb. 7, 2020, which claims priority to Chinese patent application No. 201910272864.1 filed on Apr. 4, 2019 to China National Intellectual Property Administration, both of which are incorporated herein by reference.

FIELD

The present application relates to the field of communication, in particular to a transmission configuration indication method of a DMRS port and a related apparatus, and a storage medium.

BACKGROUND

With continuous development of the communication technology, people have higher requirements for communication quality. In order to improve signal quality of margins of serviced communities and provide more balanced services in server communities, a coordinated multiple point transmission (CoMP) technology is still an important technical means in an NR system. Considering from the perspective of a network form, the CoMP technology performing network deployment in a way of a large quantity of distributed access points+baseband centralized processing will provide a balanced user experience speed in a more beneficial mode, remarkably lowers time delay and signaling overhead caused by hand-off, and improves communication quality.

According to a mapping relationship of sending signal streams to a plurality of access points, the access points may be transmission reception points (TRP) or antenna panels, and the CoMP technology may be divided into coherent transmission and non-coherent transmission. In non-coherent transmission, each data stream is only mapped to part of the access points. Compared with coherent transmission, non-coherent transmission has low requirements for synchronization between the access points and transmission capacity of a return link and is not sensitive to many non-ideal factors in real deployment conditions, being a mainly considered solution of the CoMP technology. At present, a non-coherent joint transmission (NC-JT) technology is being studied in Rel-16.

NC-JT may adopt a manner that a single physical downlink control channel (PDCCH) schedules a single physical downlink shared channel (PDSCH), called the single-PDCCH manner, and may also adopt a manner that PDCCHs respectively schedule corresponding PDSCHs, called the multi-PDCCH manner. For the single-PDCCH manner, code division multiplexing (CDM) grouping needs to be performed on demodulation reference signal (DMRS) ports according to a quasi co-located (QCL) relation, the DMRS ports in the same DMRS CDM group (CDM group for short hereafter) are QCL, that is, different pieces of QCL information are indicated through different CDM groups. To realize QCL indication, during NC-JT, a TCI field in downlink control information (DCI) corresponds to one or two transmission configuration indication states (TCI states), wherein the TCI states contain one or more reference signals used as QCL reference. However, in the prior art, when the TCI field corresponds to two TCI states, there is no clear solution for a correspondence between CDM groups and the TCI states, which affects the flexibility of NC-JT, and accordingly, there is an urgent need of a solution that each CDM to which the DMRS ports belong is flexibly indicated to correspond to the TCI states when the TCI field corresponds to two TCI states.

SUMMARY

The present application provides a transmission configuration indication method of a DMRS port and a related apparatus, and a storage medium, configured to flexibly indicate a TCI state corresponding to a CDM group to adapt to the number of ranks supported by different TRPs.

In a first aspect, the present application provides a transmission configuration indication method of a DMRS port. The method includes: configuring, by a network side device, at least two DMRS ports for a terminal according to a required mapping relationship between TCI states and CDM groups, and the at least two DMRS ports belong to different CDM groups, and the quantities of DMRS ports included in the different CDM groups are not exactly the same; and sending DCI to the terminal, and the DCI includes DMRS port index values Values, the Values are Values pre-defined in a DMRS port allocation table, and the Values are configured to indicate a set of DMRS ports allocated to the terminal, the number of CDM groups without data, and the number of front-load DMRS symbols, and are used to indicate the mapping relationship between the TCI states and the CDM groups.

In one embodiment, at least one first parameter combination is formed by a DMRS pilot type, a maximum number of front-load DMRS symbols being 1, the number of the CDM groups without data and the total number of DMRS ports; and for each first parameter combination, when a TCI field in the DCI corresponds to at least two TCI states, at least two Values corresponding to that first parameter combination correspond to the same mapping relationship between the TCI states and the CDM groups.

In one embodiment, at least one second parameter combination is formed by a DMRS pilot type, a maximum number of front-load DMRS symbols being 2, the number of actually used DMRS symbols, the number of the CDM groups without data and the total number of DMRS ports; and for each second parameter combination, if a TCI field in the DCI corresponds to at least two TCI states, at least two Values corresponding to that second parameter combination correspond to the same mapping relationship between the TCI states and the CDM groups.

In one embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In one embodiment, at least one first parameter combination is formed by a DMRS pilot type, a maximum number of front-load DMRS symbols being 1, the number of the CDM groups without data and the total number of DMRS ports; and for each first parameter combination, if a TCI field in the DCI corresponds to at least two TCI states, the mapping relationships, corresponding to the at least two Values corresponding to that first parameter combination, between the TCI states and the CDM groups are different.

In one embodiment, at least one second parameter combination is formed by a DMRS pilot type, a maximum number of front-load DMRS symbols being 2, the number of actually used DMRS symbols, the number of the CDM groups without data and the total number of DMRS ports; and for each second parameter combination, if a TCI field in the DCI corresponds to at least two TCI states, the mapping relationships, corresponding to the at least two Values corresponding to that first parameter combination, between the TCI states and the CDM groups are different.

In one embodiment, port numbers corresponding to the Values corresponding to each first parameter combination are the same; and/or, port numbers corresponding to the Values corresponding to each second parameter combination are the same.

An embodiment of the present application further provides a transmission configuration indication method of a DMRS port. The method includes: receiving, by a terminal, DCI sent by a network side device, and the DCI includes DMRS port index values Values, and the Values are Values pre-defined in a DMRS port allocation table; and determining a set of DMRS ports allocated by the network side device to the terminal, the number of CDM groups without data, the number of front-load DMRS symbols and a mapping relationship between TCI states and CDM groups according to the Values and the port allocation table, and at least two DMRS ports included in the port set belong to different DMRS code division multiplexing (CDM) groups, the quantities of the DMRS ports included in the different CDM groups are not exactly the same, and the at least two DMRS ports are determined by the network side device according to a required mapping relationship between the TCI states and the CDM groups.

In one embodiment, determining the mapping relationship between the TCI states and the CDM groups according to the Values, includes: determining the mapping relationship, corresponding to the Value, between the TCI states and the CDM groups according to a pre-definition.

In one embodiment, at least one first parameter combination is formed by a DMRS pilot type, a maximum number of front-load DMRS symbols being 1, the number of the CDM groups without data and the total number of DMRS ports; and for each first parameter combination, if a TCI field in the DCI corresponds to at least two TCI states, at least two Values corresponding to that first parameter combination correspond to the same mapping relationship between the TCI states and the CDM groups.

In one embodiment, at least one second parameter combination is formed by a DMRS pilot type, a maximum number of front-load DMRS symbols being 2, the number of actually used DMRS symbols, the number of the CDM groups without data and the total number of DMRS ports; and for each second parameter combination, if a TCI field in the DCI corresponds to at least two TCI states, at least two Values corresponding to that second parameter combination correspond to the same mapping relationship between the TCI states and the CDM groups.

In one embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In one embodiment, at least one first parameter combination is formed by a DMRS pilot type, a maximum number of front-load DMRS symbols being 1, the number of the CDM groups without data and the total number of DMRS ports; and for each first parameter combination, if a TCI field in the DCI corresponds to at least two TCI states, the mapping relationships, corresponding to the at least two Values corresponding to that first parameter combination, between the TCI states and the CDM groups are different.

In one embodiment, at least one second parameter combination is formed by a DMRS pilot type, a maximum number of front-load DMRS symbols being 2, the number of actually used DMRS symbols, the number of the CDM groups without data and the total number of DMRS ports; and for each second parameter combination, if a TCI field in the DCI corresponds to at least two TCI states, the mapping relationships, corresponding to the at least two Values corresponding to that first parameter combination, between the TCI states and the CDM groups are different.

In one embodiment, port numbers corresponding to the Values corresponding to each first parameter combination are the same; and/or, port numbers corresponding to the Values corresponding to each second parameter combination are the same.

An embodiment of the present application further provides a communication apparatus, including: a processor, a memory and a transceiver, and the processor is configured to read computer instructions in the memory and execute: configuring at least two DMRS ports for a terminal according to a required mapping relationship between TCI states and CDM groups, and the at least two DMRS ports belong to different DMRS code division multiplexing (CDM) groups, and the quantities of DMRS ports included in the different CDM groups are not exactly the same; and sending DCI to the terminal, and the DCI includes DMRS port index values Values, the Values are Values pre-defined in a DMRS port allocation table, and the Value are used to indicate a set of DMRS ports allocated to the terminal, the number of CDM groups without data, and the number of front-load DMRS symbols, and is configured to indicate the mapping relationship between the TCI states and the CDM groups.

An embodiment of the present application further provides a communication apparatus, including: a processor, a memory and a transceiver, and the processor is configured to read computer instructions in the memory and execute: receiving DCI sent by a network side device, and the DCI includes DMRS port index values Values, and the Values are Values pre-defined in a DMRS port allocation table; and determining a set of DMRS ports allocated by the network side device to the terminal, the number of CDM groups without data, the number of front-load DMRS symbols and a mapping relationship between TCI states and CDM groups according to the Values and the port allocation table, and at least two DMRS ports included in the port set belong to different DMRS code division multiplexing (CDM) groups, the quantities of the DMRS ports included in the different CDM groups are not exactly the same, and the at least two DMRS ports are determined by the network side device according to a required mapping relationship between the TCI states and the CDM groups.

An embodiment of the present application further provides a network side device. The network side device includes: a determining device, configured to configure at least two DMRS ports for a terminal according to a required mapping relationship between transmission configuration indication state information (TCI state) and CDM groups, and the at least two DMRS ports belong to different DMRS code division multiplexing (CDM) groups, and the quantities of the DMRS ports included in the different CDM groups are not exactly the same; and an executing device, configured to send downlink control information (DCI) to the terminal, and the DCI includes DMRS port index values Values, the Values are Values pre-defined in a DMRS port allocation table, and the Values are used to indicate a set of DMRS ports allocated to the terminal, the number of CDM groups without data, and the number of front-load DMRS symbols, and are used to indicate the mapping relationship between the TCI states and the CDM groups.

An embodiment of the present application further provides a terminal. The terminal includes: a receiving device, configured to receive DCI sent by a network side device, and the DCI includes DMRS port index values Values, and the Values are Values pre-defined in a DMRS port allocation table; and a parameter determining device, configured to determine a set of DMRS ports allocated by the network side device to the terminal, the number of CDM groups without data, the number of front-load DMRS symbols and a mapping relationship between TCI states and CDM groups according to the Values and the port allocation table, and at least two DMRS ports included in the port set belong to different DMRS code division multiplexing (CDM) groups, the quantities of the DMRS ports included in the different CDM groups are not exactly the same, and the at least two ports are determined by the network side device according to a required mapping relationship between the TCI states and the CDM groups.

An embodiment of the present application further provides a computer-readable storage medium, storing a computer program thereon, and steps of any transmission configuration indication method of the DMRS port are implemented when the program is executed by a processor.

In the embodiments of the present application, when the network side device allocates the ports to the terminal according to the required mapping relationship between the CDM groups and the TCI states, each mapping relationship corresponds to one Value in the port allocation table, and therefore different mapping relationships can be realized by switching different Values. When Value=9, there are two DMRS ports in a CDM group 0 corresponding to a TCI state 0, and there is one DMRS port in a CDM group 1 corresponding to a TCI state 1. If a TRP 0 and a TRP 1 need to respectively support data transmission of a rank 1 and a rank 2, Value=12 (a specific value may be determined according to actual requirements) is newly added into the port allocation table to enable the CDM group 0 corresponding to the TCI state of the TRP 0 to include one port and enable the CDM group 1 corresponding to the TCI state of the TRP 1 to include two ports. Since each TCI state corresponds to one transmitting and receiving point, the mapping relationship between the TCI states and the CDM groups may be dynamically adjusted through switching between Value=9 and Value=12 so that the TRP 0 and the TRP 1 can respectively support data transmission manners of the rank 1 and the rank 2.

These or other aspects of the present application will be clearer and more easily understood in the description of the following embodiments.

BRIEF DESCRIPTION OF THE DRAWINGS

FIG. 3 is a schematic structural diagram of a communication apparatus provided by an embodiment of the present application.

FIG. 4 is a schematic structural diagram of another communication apparatus provided by an embodiment of the present application.

FIG. 5 is a schematic flow diagram of a transmission configuration indication method of a DMRS port provided by an embodiment of the present application.

DETAILED DESCRIPTION OF THE EMBODIMENTS (1) A network side device is a device providing a wireless communication function for a terminal, including but not limited to: a gNB in 5G, a radio network controller (RNC), a node B (NB), a base station controller (BSC), a base transceiver station (BTS), a home base station (e.g., a home evolved node B or a home node B (HNB)), a baseband unit (BBU), a transmitting and receiving point (TRP), a transmitting point (TP), a mobile switching center and the like. The base station in the present application may further be a device providing the wireless communication function for the terminal in other communication systems that may appear in the future.

(2) A terminal is a device that can provide a user with voice and/or data connectivity. For example, a terminal device includes a handheld device, a vehicle-mounted device and the like with a wireless connection function. At present, the terminal device may be: a mobile phone, a pad, a laptop, a palmtop, a mobile internet device (MID), a wearable device, a virtual reality (VR) device, an augmented reality (AR) device, a wireless terminal in industrial control, a wireless terminal in self-driving, a wireless terminal in a smart grid, a wireless terminal in transportation safety, a wireless terminal in a smart city, or a wireless terminal in a smart home, or the like.

(3) A DMRS port adopts a manner of frequency-division multiplexing (FDM)+code division multiplexing (CDM) for multiplexing, and each CDM group is divided into DMRS ports through an orthogonal cover code (OCC). An NR system supports two DMRS pilot types (a DMRS pilot type 1 and a DMRS pilot type 2), and multiplexing and configuration manners of the two DMRS pilot types are specifically described as follows.

Figure 1A:
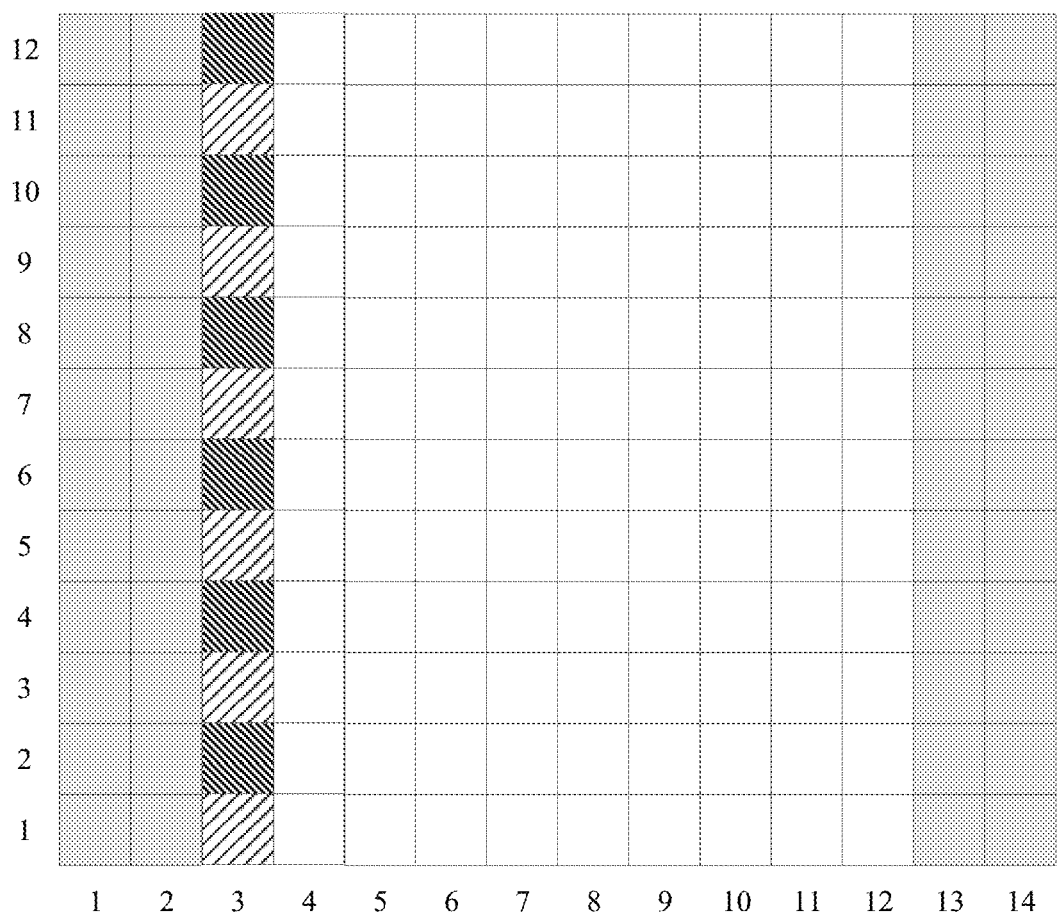
FIGS. 1A and 1B are schematic diagrams of DMRS resources of a DMRS pilot type 1 in an embodiment of the present application.
Figure 1B:
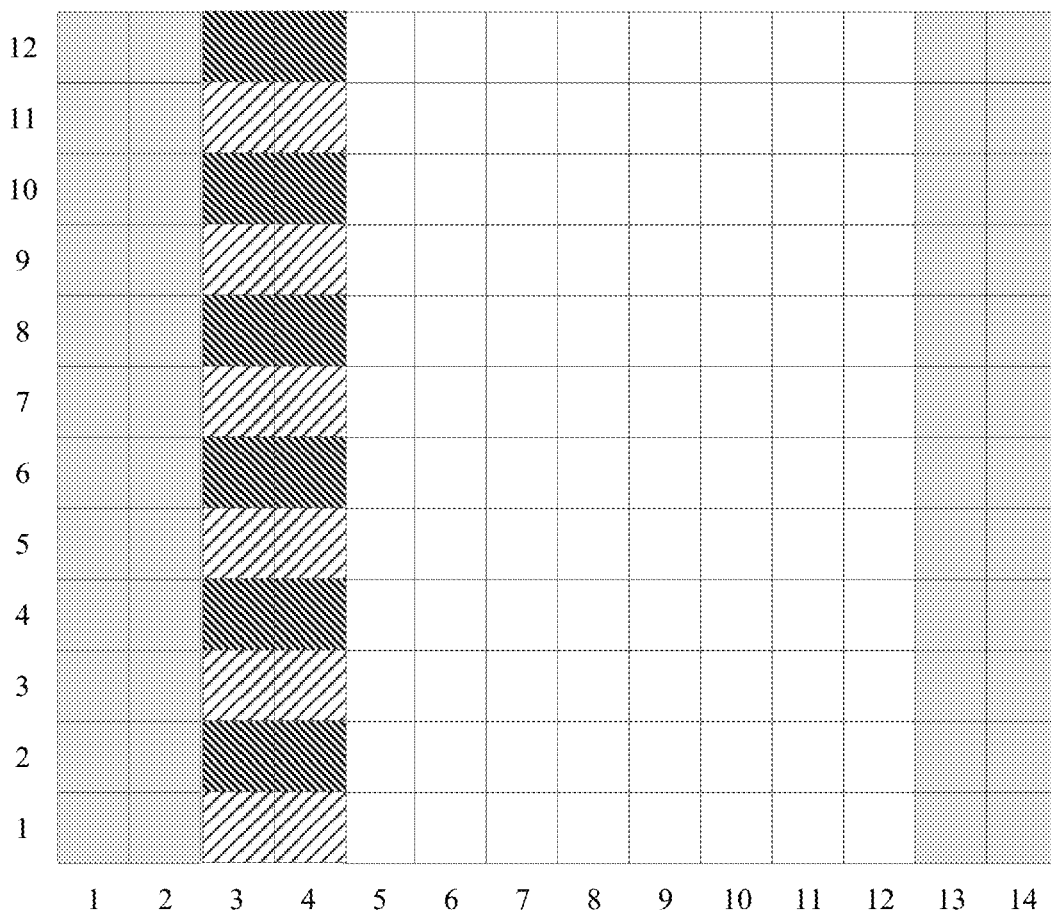

For the DMRS pilot type 1, referring to FIG. 1A and FIG. 1B, front-load symbols are divided into two CDM groups. As shown in FIG. 1A, when only one (single) front-load symbol (an OFDM symbol with a corresponding number of 3 in the horizontal axis in the figure) is configured, subcarriers (the longitudinal axis in the figure) of the OFDM symbol are divided into two groups, namely the OFDM symbol is divided into two CDM groups, each CDM group corresponds to a single OFDM symbol, and multiplexing of two ports is supported through an OCC manner. As shown in FIG. 1A, one CDM group supports DMRS resources (REs) of antenna ports 0/1, and the other CDM group supports DMRS REs of antenna ports 2/3. As shown in FIG. 1B, when two (double) front-load symbols (OFDM symbols with corresponding numbers of 3 and 4) are configured, sub-carriers of the OFDM symbols are divided into two groups, namely the OFDM symbols are divided into two CDM groups, each CDM group corresponds to double OFDM symbols, and multiplexing of four ports is supported through the OCC manner. As shown in FIG. 1B, one CDM group supports DMRS REs of antenna ports 0/1/4/5, and the other CDM group supports DMRS REs of antenna ports 2/3/6/7.

Figure 2A:
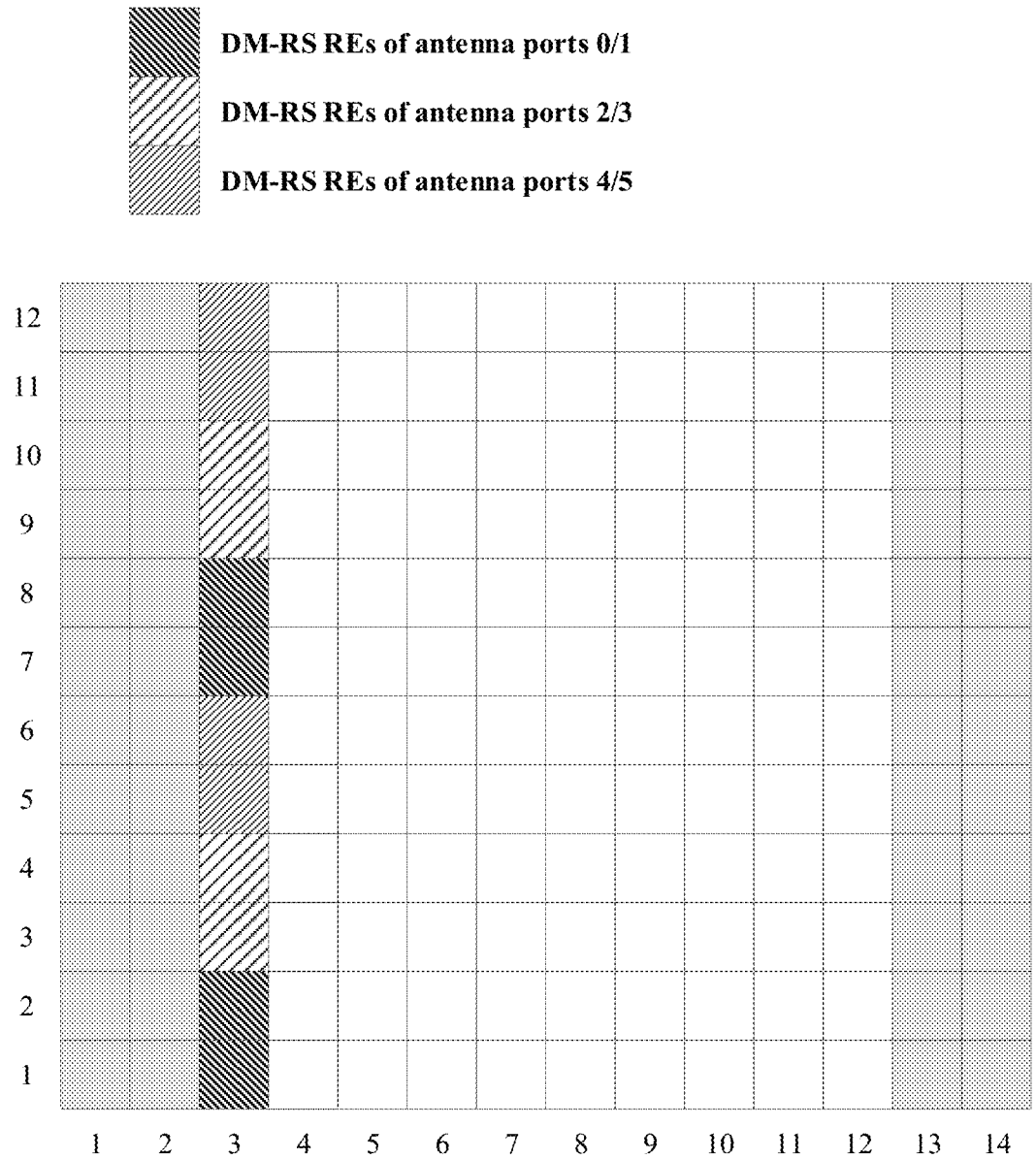
FIGS. 2A and 2B are schematic diagrams of DMRS resources of a DMRS pilot type 2 in an embodiment of the present application.
Figure 2B:
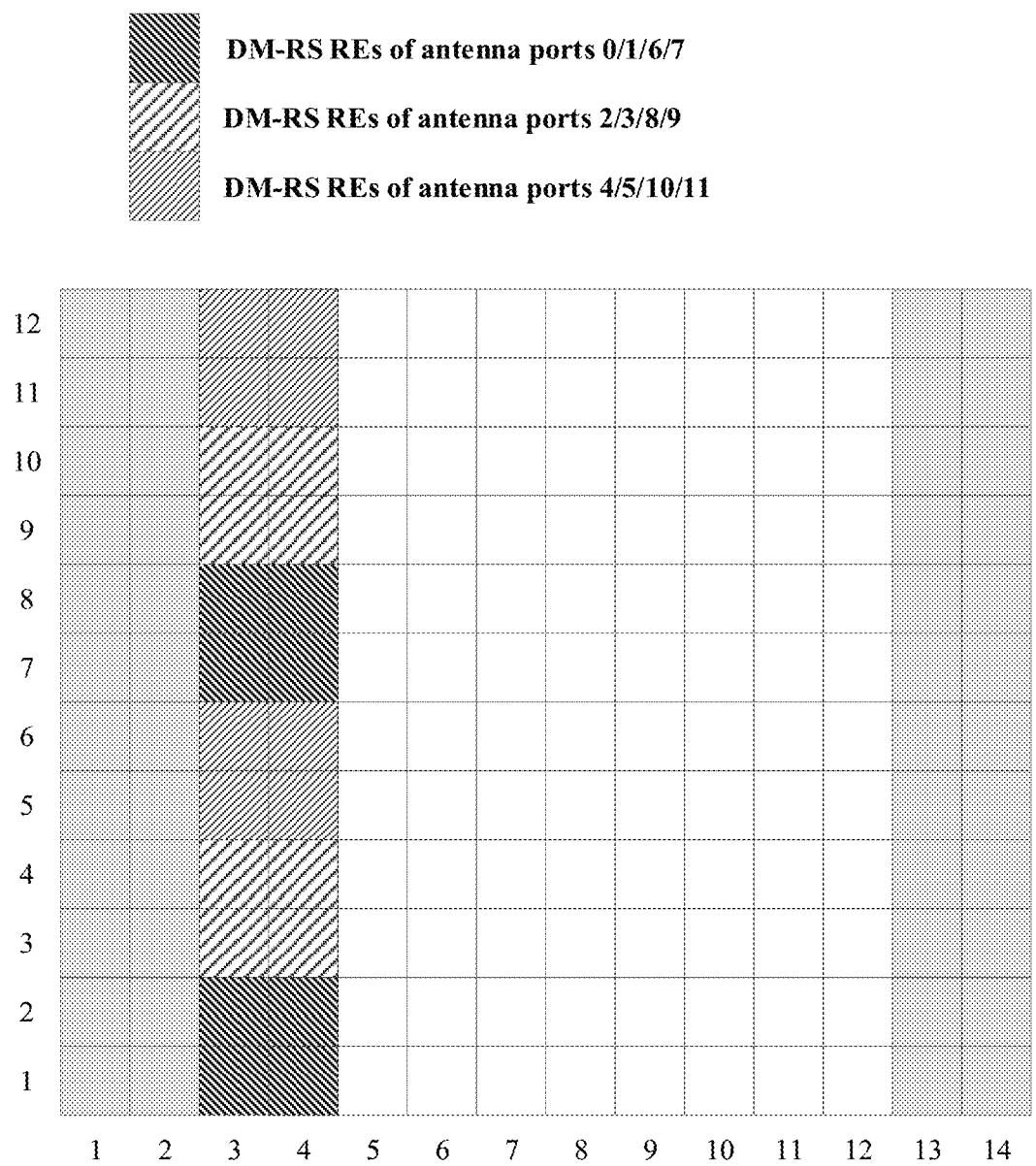

According to the DMRS pilot type 2, referring to FIG. 2A and FIG. 2B, front-load symbols are divided into three CDM groups. As shown in FIG. 2A, when only one (single) front-load symbol (an OFDM with a corresponding number of 3) is configured, sub-carriers of the OFDM symbol are divided into three groups, each group is composed of two adjacent subcarriers, namely the OFDM symbol is divided into three CDM groups, each CDM group corresponds to a single OFDM symbol, and multiplexing of two ports is supported through the OCC manner. As shown in FIG. 2A, one CDM group supports DMRS REs of the antenna ports 0/1, one CDM group supports DMRS REs of the antenna ports 2/3, and another CDM group supports DMRS REs of antenna ports 4/5. As shown in FIG. 2B, when two (double) front-load symbols (OFDM symbols with corresponding numbers of 3 and 4) are configured, sub-carriers of the OFDM symbols are divided into three groups, each group is composed of two adjacent subcarriers, namely the OFDM symbols are divided into three CDM groups, each CDM group corresponds to double OFDM symbols, and multiplexing of four ports is supported through the OCC manner. As shown in FIG. 2B, one CDM group supports DMRS REs of antenna ports 0/1/6/7, one CDM group supports DMRS REs of antenna ports 2/3/8/9, and another CDM group supports DMRS REs of antenna ports 4/5/10/11.

(4) Allocation manner of DMRS ports. In TS38.212, an allocation manner of the DMRS ports may be shown in Table 1 to Table 4 below.

TABLE 1

Allocation manner of DMRS ports when only one OFDM symbol is configured under DMRS pilot type 1 (Antenna port(s) (1000 + DMRS port), dmrs-Type = 1, maxLength = 1). One Codeword Codeword 0 enabled, Codeword 1 disabled

| Value | Number of CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 2

Allocation manner of DMRS ports when at most two OFDM symbols are configured under DMRS pilot type 1 (Antenna port(s) (1000 + DMRS port), dmrs-Type = 1, maxLength = 2).

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |

TABLE 2-continued

Allocation manner of DMRS ports when at most two OFDM symbols are configured under DMRS pilot type 1 (Antenna port(s) (1000 + DMRS port), dmrs-Type = 1, maxLength = 2).

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 3

Allocation manner of DMRS ports when only one OFDM symbol is configured under DMRS pilot type 2 (Antenna port(s) (1000 + DMRS port), dmrs-Type = 2, maxLength = 1).

| | One codeword: Codeword 0 enabled, Codeword 1 disabled | | | Two codewords: Codeword 0 enabled, Codeword 1 enabled | |
|---|---|---|---|---|---|
| Value | Number of CDM group(s) without data | DMRS port(s) | Value | Number of CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 4

Allocation manner of DMRS ports when at most two OFDM symbols are configured under DMRS pilot type 2 (Antenna port(s) (1000 + DMRS port), dmrs-Type = 2, maxLength = 2).

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |

TABLE 4-continued

Allocation manner of DMRS ports when at most two OFDM symbols are configured under DMRS pilot type 2 (Antenna port(s) (1000 + DMRS port), dmrs-Type = 2, maxLength = 2).

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

In above Table 1 to Table 4, after allocating a DMRS port to the terminal, a base station sends corresponding TCI information to the terminal, and thus transmission configuration of the DMRS port may be indicated to the terminal. A value of the TCI information is "value" in Table 1 to Table 4.

For example, in the case that the DMRS pilot type 1 is adopted and only one OFDM symbol is configured, if the base station allocates a DMRS port 0 and a DMRS port 2 to the terminal and configures two CDM groups (according to a regulation in TS38.212, the DMRS port 0 and the DMRS port 2 belong to different CDM groups respectively), the base station sends downlink control information (DCI) to the terminal. The DCI includes TCI, and according to Table 1, the TCI information includes that the value is 11. The terminal may know the DMRS port 0 and the DMRS port 2 allocated by the base station to it according to the received TCI.

(5) QCL is a state hypothesis between the antenna ports, and if one antenna port and another antenna port are quasi co-located, it means that large-scale parameters of signals received by one antenna port may be integrally or partially inferred from large-scale parameters of signals received by another antenna port. The large-scale parameters include one or more of delay spread, Doppler spread, Doppler shift, space reception parameters, average channel gains, average time delay and the like.

QCL appears with a CoMP technology, TRPs or antenna panels involved in a CoMP process may correspond to sectors where TRPs or antenna panels different in geographic position have different directions. For example, when the terminal receives data from the different TRPs or antenna panels, spatial differences of the TRPs or antenna panels will cause different large-scale channel parameters from receiving links of the different TRPs or antenna panels, such as Doppler frequency offset and delay spread. The large-scale parameters of channels directly affect adjustment and optimization of filter coefficients during channel estimation, and corresponding to signals sent by the different TRPs or antenna panels, different channel estimation filtering parameters should be configured to adapt to corresponding channel transmission properties. Therefore, although differences of the TRPs or antenna panels in spatial position or angle are transparent to the terminal and a multi-point transmission operation itself, the influence of the above spatial differences on the large-scale channel parameters is an important factor that needs to be considered during channel estimation and receiving detection of the terminal. Two antenna ports are QCL under certain large-scale parameter significance, it means that these large-scale parameters of the two antenna ports are the same, alternatively, as long as certain large-scale parameters of the two ports are consistent, no matter whether they have differences in actual physical position or in direction of the corresponding antenna panels, the terminal may consider that the two antenna ports are from the same position (namely quasi co-located in site).

For some typical application scenarios, considering a possible QCL relation between various reference signals, from the perspective of simplifying signaling, several large-scale channel parameters are divided into following 4 types in the NR system, and corresponding to the 4 QCL types, the system may perform configuration or indication conveniently according to different scenarios.

QCL-Type A: parameters involved in the QCL type include: {Doppler shift, Doppler spread, average time delay, delay spread}. All large-scale parameters, except a space reception parameter, are the same. For a frequency band below 6 GHz, the space reception parameter may be not needed.

QCL-Type B: parameters involved in the QCL type include: {Doppler shift, Doppler spread}. Only for following two cases of the frequency band below 6 GHz.

Case 1: when a narrow-beam reference signal is used, a wide-beam reference signal may be used as QCL reference. For example, a time frequency tracking reference signal (TRS) is generally sent with a sector-level wide beam, and a channel state information-reference signal (CSI-RS) may be sent with a narrow beam. In this case, it is generally considered that Doppler parameters experienced by signals sent from the same site (e.g., TRP or antenna panel) are still approximately consistent. However, scatterers covered by beams of different widths are different, so that the delay spread and average time delay parameters experienced by the signals during propagation will be affected. In this case, it cannot be assumed that the CSI-RS and the TRS are QCL under the significance of the delay spread and average time delay parameters.

Case 2: a target reference signal is insufficient in time domain density, but sufficient in frequency domain density. For example, when the TRS is used as QCL reference of the CSI-RS, the time domain density of the CSI-RS depends on configuration and may be insufficient to accurately estimate Doppler parameters of a channel, and thus the Doppler parameters may be obtained from the TRS which is QCL with the CSI-RS. In another aspect, the frequency domain density of the CSI-RS is sufficient for estimating frequency domain parameters such as average time delay and delay spread, and thus these parameters may be obtained from the CSI-RS itself.

QCL-Type C: parameters involved in the QCL type include: {Doppler shift, average time delay}. It is only for the case that a synchronization signal block (SSB) is used as QCL reference in a frequency band above 6 GHz. Since the SSB is limited in occupied resource and density, it is generally assumed that only some relatively rough large-scale information can be obtained from the SSB, namely Doppler shift and average time delay, while other large-scale parameters need to be obtained from the target reference signal itself.

QCL-Type D: parameters involved in the QCL type include: {space reception parameter}. As described above, since this parameter is mainly for the frequency band above 6 GHz, it is used as a QCL type alone.

In an embodiment of the present application, one or more reference signals used as QCL reference contained in a TCI state may be one or more of a TRS, a CSI-RS and so on.

During NC-JT, a correspondence between CDM groups and the TCI states needs to be determined, but there is no clear solution currently. One proposal suggests that if there are two TCI states, the first TCI state is used as QCL reference of a CDM group 0, and the second TCI state is used as QCL reference of remaining CDM groups. Since one TCI state corresponds to one TRP actually, generally, each TRP can support different quantities of ranks. For example, it is possible that a TRP (corresponding to a TCI state 0) can support a rank 1, while a TRP 1 (corresponding to a TCI state 1) can support a rank 2, and the two TRPs can support the total rank=3. However, according to a DMRS port allocation table, when rank=3, there are two DMRS ports in the CDM group 0, and there is one DMRS port in the CDM group 1. If the fixed correspondence between the TCI state and the CDM group as suggested in the above proposal is followed, then the TRP 0 and the TRP 1 cannot be supported to respectively send transmission manners of the rank 1 and the rank 2.

For the above scenario, a solution which can dynamically adjust a mapping relationship between TCI states and CDM groups is provided in the embodiment of the present application. In the solution, when a network side device allocates ports, the ports may be allocated according to ranks supported by transmitting and receiving points to adapt to combinations of ranks supported by different TRPs. For example, continuing the example above, when Value=9, there are two DMRS ports in the CDM group 0 corresponding to the TCI state 0, and there is one DMRS port in the CDM group 1 corresponding to the TCI state 1. If the TRP 0 and the TRP 1 need to respectively support data transmission of the rank 1 and the rank 2, Value=12 (a specific value may be determined according to actual requirements) is newly added into the port allocation table to enable the CDM group 0 corresponding to the TCI state of the TRP 0 to include one port and enable the CDM group 1 corresponding to the TCI state of the TRP 1 to include two ports. The mapping relationship between the TCI states and the CDM groups may be dynamically adjusted through switching between Value=9 and Value=12 so that the TRP 0 and the TRP 1 can respectively support data transmission manners of the rank 1 and the rank 2.

Figure 2C:
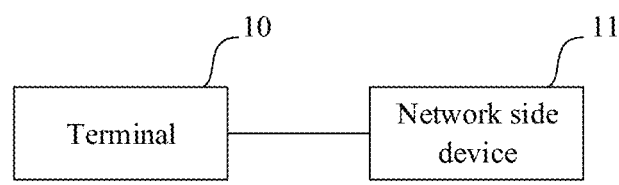
FIG. 2C is a system structural diagram.

Referring to FIG. 2C which is a schematic diagram of a system for channel state information feedback provided by an embodiment of the present application, the system includes a network side device 11 and a terminal 10.

The network side device 11, configured to configure at least two DMRS ports for a terminal according to a required mapping relationship between transmission configuration indication state information (TCI states) and CDM groups, and the at least two DMRS ports belong to different DMRS CDM groups, and the quantities of the DMRS ports included in the different CDM groups are not exactly the same; and send DCI to the terminal, and the DCI includes DMRS port index values Values, the Values are Values pre-defined in a DMRS port allocation table, and the Values used to indicate a set of the at least two DMRS ports configured to the terminal, a number of CDM groups without data, and a number of front-load DMRS symbols, and are used to indicate the mapping relationship between the TCI states and the CDM groups.

The terminal 10, configured to receive the DCI sent by the network side device, and the DCI includes the DMRS port index values Values; and determine the set of the at least two DMRS ports, the number of the CDM groups without data, the number of the front-load DMRS symbols, and the mapping relationship between the TCI states and the CDM groups configured by the network side device to the terminal according to the Values and the port allocation table.

According to a transmission configuration indication method of a DMRS port provided by an embodiment of the present application, a mapping relationship between a TCI state and a corresponding CDM group may be obtained through a value, a mapping relationship between corresponding TCI states and CDM groups may be obtained by selecting different values during port allocation according to actual requirements, and the manner may improve the flexibility of NC-JT.

Embodiment of the present application show how to determine the mapping relationship between the TCI states and the CDM groups through the Values is described below, and it may be implemented as following two manners.

(1) Manner 1

In an embodiment, for Table 1 and Table 3, at least one first parameter combination is formed by a DMRS pilot type, a maximum number of front-load DMRS symbols being 1, the number of the CDM groups without data and the total number of the DMRS ports. For each first parameter combination, if a TCI field in the DCI corresponds to at least two TCI states, at least two Values corresponding to that first parameter combination correspond to the same mapping relationship between the TCI states and the CDM groups.

Similarly, for Table 2 and Table 4, at least one second parameter combination is formed by a DMRS pilot type, a maximum number of front-load DMRS symbols being 2, a number of actually used DMRS symbols, the number of the CDM groups without data and the total number of the DMRS ports. For each second parameter combination, if a TCI field in the DCI corresponds to at least two TCI states, at least two Values corresponding to that second parameter combination correspond to the same mapping relationship between the TCI states and the CDM groups.

That is, in the case of the same (first/second) parameter combination, the mapping relationships, corresponding to Values, between the TCI states and the CDM groups are the same. For example, the mapping relationships corresponding to Value=9 and Value=12 are both (the TCI state 0 corresponds to the CDM group 0; the TCI state 1 corresponds to the CDM group 1). Through the solution, for one (first and/or second) parameter combination, there is only one mapping relationship corresponding to Value=9 and Value=12, and thus the mapping relationships, corresponding to different Values, between the TCI states and the CDM groups under different parameter combinations are convenient to manage.

In an embodiment, for one (first/second) parameter combination, when it corresponds to at least two Values, if the Values are different, the correspondences between the quantities of the DMRS ports contained in the CDM groups and the CDM groups are different. For example: in the first parameter combination, the DMRS pilot type is 1, the maximum number of front-load DMRS symbols is 1, the number of the CDM groups without data is 2, and the total number of the DMRS ports is 3. As shown in Table 5, under the first parameter combination, the corresponding Value in Table 1 is 9, and if a Value=12 corresponding to the first parameter combination is added as the above example, in the case of Value=9, the CDM group 0 includes two ports, and the CDM group 1 includes one port (i.e., a correspondence 1 between the quantities of the DMRS ports contained in the CDM groups and the CDM groups). In the case of Value=12, the CDM group 0 includes one port, and the CDM group 1 includes two ports (i.e., a correspondence 2 between the quantities of the DMRS ports contained in the CDM groups and the CDM groups).

TABLE 5

Correspondence between quantities of DMRS ports contained in CDM groups and CDM groups

| Value | Number of DMRS ports contained in CDM groups | CDM group | |
|---|---|---|---|
| 9 | 2 | 0 | Correspondence 1 |
|  | 1 | 1 |  |
| 12 | 1 | 0 | Correspondence 2 |
|  | 2 | 1 |  |

Since the mapping relationships between the TCI states and the CDM groups are the same when Value=9 and Value=12, it is further known from Table 5 that although the mapping relationships, corresponding to the two Values, between the TCI states and the CDM groups are the same, under each mapping relationship, the CDM groups corresponding to the same TCI state are different in number of the contained ports. Accordingly, the TRPs corresponding to the TCI states may support transmission manners of different rank quantities by switching different Values.

In an embodiment, in the case of the same first and/or second parameter combination, port numbers corresponding to different Values may be partially multiplexed. For example, the port numbers corresponding to Value=9 are 0-2, and the port numbers corresponding to Value=12 are 0, 2, 3. 0 and 2 are the multiplexed port numbers. During specific implementation, the port numbers may also be not multiplexed, as long as the total quantities of the ports corresponding to the same CDM group are different when different Values are realized.

(2) Manner 2

A main difference from the manner 1 is that in the case of the same parameter combination, the different Values in the manner 1 correspond to the same mapping relationship between the TCI states and the CDM groups. Different Values in the manner 2 correspond to different mapping relationships between the TCI states and the CDM groups. It may be specifically implemented that for each first parameter combination, if the TCI field in the DCI corresponds to at least two TCI states, at least two Values corresponding to that first parameter combination correspond to different mapping relationships between the TCI states and the CDM groups.

For example, in the first parameter combination, the DMRS pilot type is 1, the maximum number of the front-load DMRS symbols is 1, the number of the CDM groups without data is 2, and the total number of the DMRS ports is 3. In the case of Value=9, the first mapping relationship is that the TCI state 0 corresponds to the CDM group 0 (containing two ports); and the TCI state 1 corresponds to the CDM group 1 (including one port). In the case of Value=12, the second mapping relationship is that the TCI state 0 corresponds to the CDM group 1 (containing two port); and the TCI state 1 corresponds to the CDM group 0 (including one port).

Similarly, for each second parameter combination, if the TCI field in the DCI corresponds to at least two TCI states, at least two Values corresponding to that second parameter combination correspond to different mapping relationships between the TCI states and the CDM groups.

The port numbers corresponding to the Values corresponding to each first parameter combination are the same; and/or, the port numbers corresponding to the Values corresponding to each second parameter combination are the same. Accordingly, when the port allocation table is configured, the same parameter combination only needs to use the same port number, so that configuration of the port allocation table is simple and easy.

For example, in the first and second mapping relationships above, the port numbers contained in the CDM group 0 are (0, 1), and the port numbers contained in the CDM group 1 are (2).

In summary, in the embodiment of the present application, the mapping relationship between the TCI states and the CDM groups is dynamically adjusted by switching different Values in the case of the same parameter combination. To realize the solution, in the embodiment of the present application, corresponding Values are added in above Table 1 to Table 4.

To facilitate understanding, the embodiment of the present application is further described here by comparing Table 1, Table 4 and modified tables.

(1) For Table 1, the situation is that the DMRS configuration type is 1, and the number of the front-load DMRS symbols is 1.

Case 1, when Rank=1, the allocated DMRS ports only belong to one CDM group (only one TCI state is needed at the moment), and when the TCI field indicated by the DCI corresponds to two TCI states, a pre-defined correspondence between the TCI states and the CDM groups may be the basis. For example, the TCI state 0 corresponds to the CDM group, or the TCI state 1 corresponds to the CDM group.

Case 2, Rank=2.

First, when Rank=2, if the allocated DMRS ports only belong to one CDM group (only one TCI state is needed at the moment), when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Second, when Rank=2, if the allocated DMRS ports belong to two CDM groups, the number of the ports allocated in each CDM group is the same at the moment, a DMRS table does not need to be changed (new Values do not need to be added for this case), but the correspondence between the TCI states and the CDM groups needs to be determined. For example, it may be agreed that the TCI state 0 corresponds to the CDM group 0, and the TCI state 1 corresponds to the CDM group 1.

Case 3, Rank=3.

When Rank=3 (the allocated DMRS ports occupy two CDM groups), it needs to be noted that in the existing DMRS port allocation table, namely Table 1, Value=9 occupies ports 0/1/2, and the ports 0/1 correspond to the CDM group 0, while the port 2 corresponds to the CDM group 1.

One Value is added for the case of Rank=3.

In the existing DMRS port allocation table, namely Table 1, Value=9 occupies the ports 0/1/2, and the ports 0/1 correspond to the CDM group 0, while the port 2 corresponds to the CDM group 1.

Manner 1

In port allocation corresponding to the newly added Value, one port belongs to the CDM group 0, while remaining two ports belong to the CDM group 1, as shown in Table 6-1. For example, port allocation corresponding to the added Value is ports 0/2/3, and the port 0 belongs to the CDM group 0, while the ports 2/3 belong to the CDM group 1.

The correspondence between the TCI states and the CDM groups is pre-defined, for example, when the TCI field indicated in the DCI corresponds to two TCI states, the TCI state 0 corresponds to the CDM group 0, while the TCI state 1 corresponds to the CDM group 1.

When Rank=3, the Rank supported by each TRP may be dynamically fitted by switching Value=9 and the newly added Value (e.g., Value=12). For example, when Value=9, the TCI state 0 corresponds to the CDM group 0 (containing the ports 0, 1), while the TCI state 1 corresponds to the CDM group 1 (containing the port 2). When Value=12, the TCI state 0 corresponds to the CDM group 0 (containing the port 0), while the TCI state 1 corresponds to the CDM group 1 (containing the ports 2, 3).

Manner 2

When Rank=3, for Value=9, a mapping relationship between the CDM groups and the TCI states is pre-defined, for example, when the TCI field indicated in the DCI corresponds to two TCI states, the TCI state 0 corresponds to the CDM group 0, while the TCI state 1 corresponds to the CDM group 1.

Port allocation corresponding to the newly added Value (e.g., Value=12) is also the ports 0/1/2, and meanwhile, for the newly added Value, the mapping relationship between the CDM groups and the TCI states is also pre-defined, as shown in Table 6-2, for example, when the TCI field indicated in the DCI corresponds to two TCI states, the TCI state 1 corresponds to the CDM group 0, while the TCI state 0 corresponds to the CDM group 1.

When Rank=3, the Rank supported by each TRP may be dynamically fitted by switching Value=9 and the newly added Value (e.g., Value=12). For example, when Value=9, the TCI state 0 corresponds to the CDM group 0 (containing the ports 0, 1), while the TCI state 1 corresponds to the CDM group 1 (containing the port 2). When Value=12, the TCI state 0 corresponds to the CDM group 1 (containing the port 2), while the TCI state 1 corresponds to the CDM group 0 (containing the ports 0, 1).

Case 4, when Rank=4 (the allocated DMRS ports belong to two CDM groups), the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, and the TCI state 1 corresponds to the CDM group 1.

TABLE 6-1

Allocation manner of DMRS ports when only one OFDM symbol is configured under DMRS pilot type 1 (Antenna port(s) (1000 + DMRS port), dmrs-Type = 1, maxLength = 1).
One Codeword
Codeword 0 enabled,
Codeword 1 disabled

| Value | Number of CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0, 2, 3 |
| 13-15 | Reserved | Reserved |

TABLE 6-2

Allocation manner of DMRS ports when only one OFDM symbol is configured under DMRS pilot type 1 (Antenna port(s) (1000 + DMRS port), dmrs-Type = 1, maxLength = 1).
One Codeword
Codeword 0 enabled,
Codeword 1 disabled

| Value | Number of CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0-2 |
| 13-15 | Reserved | Reserved |

(2) For Table 2, the situation is that the DMRS configuration type is 1, and the number of the front-load DMRS symbols is 2.

Case 1: when Rank=1, the allocated DMRS ports only belong to one CDM group (only one TCI state is needed at the moment), and when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Case 2, Rank=2.

First, when Rank=2, if the allocated DMRS ports only belong to one CDM group (only one TCI state is needed at the moment), when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group. In addition, when Rank=2, if the allocated DMRS ports belong to two CDM groups, the number of the ports allocated in each CDM group is the same at the moment, the DMRS table does not need to be changed (new Values do not need to be added for this case), but the correspondence between the TCI states and the CDM groups needs to be determined. For example, it may be agreed that the TCI state 0 corresponds to the CDM group 0, and the TCI state 1 corresponds to the CDM group 1.

Second, when Rank=2, if the allocated DMRS ports belong to two CDM groups, the number of the ports allocated in each CDM group is the same at the moment, the DMRS table does not need to be changed (new Values do not need to be added for this case), but the correspondence between the TCI states and the CDM groups needs to be determined. For example, the network side device and the terminal may agree that the TCI state 0 corresponds to the CDM group 0, while the TCI state 1 corresponds to the CDM group 1 (or the TCI state 0 corresponds to the CDM group 1, while the TCI state 1 corresponds to the CDM group 0).

Case 3, Rank=3.

First, when Rank=3 and the allocated DMRS ports belong to two CDM groups, it needs to be noted that in the existing DMRS port allocation table, namely Table 1, Value=9 occupies the ports 0/1/2, and the ports 0/1 correspond to the CDM group 0, while the port 2 corresponds to the CDM group 1.

One Value is added for the case of Rank=3.

In the existing DMRS port allocation table, namely Table 1, Value=9 occupies the ports 0/1/2, and the ports 0/1 correspond to the CDM group 0, while the port 2 corresponds to the CDM group 1.

Manner 1

In port allocation corresponding to the newly added Value, one port belongs to the CDM group 0, while remaining two ports belong to the CDM group 1, as shown in Table 7-1. For example, port allocation corresponding to the added Value is the ports 0/2/3, and the port 0 belongs to the CDM group 0, while the ports 2/3 belong to the CDM group 1.

The correspondence between the TCI states and the CDM groups is pre-defined, for example, when the TCI field indicated in the DCI corresponds to two TCI states, the TCI state 0 corresponds to the CDM group 0, while the TCI state 1 corresponds to the CDM group 1.

When Rank=3, the Rank supported by each TRP may be dynamically fitted by switching Value=9 and the newly added Value (e.g., Value=31). For example, when Value=9, the TCI state 0 corresponds to the CDM group 0 (containing the ports 0, 1), while the TCI state 1 corresponds to the CDM group 1 (containing the port 2). When Value=31, the TCI state 0 corresponds to the CDM group 0 (containing the port 0), while the TCI state 1 corresponds to the CDM group 1 (containing the ports 2, 3).

Manner 2

When Rank=3, for Value=9, a mapping relationship between the CDM groups and the TCI states is pre-defined, for example, when the TCI field indicated in the DCI corresponds to two TCI states, the TCI state 0 corresponds to the CDM group 0, while the TCI state 1 corresponds to the CDM group 1.

Port allocation corresponding to the newly added Value (e.g., Value=31) is also 0/1/2, and meanwhile, for the newly added Value, the mapping relationship between the CDM groups and the TCI states is also pre-defined, as shown in Table 7-2, for example, when the TCI field indicated in the DCI corresponds to two TCI states, the TCI state 1 corresponds to the CDM group 0, while the TCI state 0 corresponds to the CDM group 1.

When Rank=3, the Rank supported by each TRP may be dynamically fitted by switching Value=9 and the newly added Value (e.g., Value=31). For example, when Value=9, the TCI state 0 corresponds to the CDM group 0 (containing the ports 0, 1), while the TCI state 1 corresponds to the CDM group 1 (containing the port 2). When Value=31, the TCI state 0 corresponds to the CDM group 1 (containing the port 2), while the TCI state 1 corresponds to the CDM group 0 (containing the ports 0, 1).

Second, when Rank=3 and the allocated DMRS ports occupy one CDM group (only one TCI state is needed at the moment), when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Case 4, Rank=4.

First, when Rank=4, if the allocated DMRS ports only belong to one CDM group (only one TCI state is needed at the moment), when the TCI field indicated by the DCI corresponds to two TCI states, the pre-defined correspondence between the TCI states and the CDM groups may be the basis. For example, the TCI state 0 or 1 is used.

Second, when Rank=4, if the allocated DMRS ports belong to two CDM groups, the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, and the TCI state 1 corresponds to the CDM group 1.

Case 5, Rank=5 (two codewords are used at the moment).

When Rank=5, Value=0 occupies ports 0, 1, 2, 3, 4, and the ports 0/1/4 belong to the CDM group 0, while the ports 2/3 belong to the CDM group 1.

One Value is added for the case of Rank=3.

Manner 1

In port allocation corresponding to the newly added Value, two ports belong to the CDM group 0, while three ports belong to the CDM group 1, as shown in Table 7-1. For example, port allocation corresponding to the added Value is ports 0, 1, 2, 3, 6, and the ports 0/1 belong to the CDM group 0, while the ports 2/3/6 belong to the CDM group 1.

The correspondence between the TCI states and the CDM groups is pre-defined, and when the TCI field indicated in the DCI corresponds to two TCI states, the TCI state 0 corresponds to the CDM group 0, while the TCI state 1 corresponds to the CDM group 1.

When Rank=5, the Rank supported by each TRP may be dynamically fitted by switching Value=0 and the newly added Value (e.g., Value=4). For example, when Value=0, the TCI state 0 corresponds to the CDM group 0 (containing the ports 0, 1, 4), while the TCI state 1 corresponds to the CDM group 1 (containing the ports 2, 3). When Value=4, the TCI state 0 corresponds to the CDM group 0 (containing the ports 0, 1), while the TCI state 1 corresponds to the CDM group 1 (containing the ports 2, 3, 6).

Manner 2

For Value=0, the mapping relationship between the CDM groups and the TCI states is pre-defined, for example, when the TCI field indicated in the DCI corresponds to two TCI states, the TCI state 0 corresponds to the CDM group 0, while the TCI state 1 corresponds to the CDM group 1.

Port allocation corresponding to the newly added Value (e.g., Value=4) is also 0-4, and meanwhile, for the newly added Value, the mapping relationship between the CDM groups and the TCI states is also pre-defined, as shown in Table 7-2, for example, when the TCI field indicated in the DCI corresponds to two TCI states, the TCI state 1 corresponds to the CDM group 0, while the TCI state 0 corresponds to the CDM group 1.

When Rank=5, the Rank supported by each TRP may be dynamically fitted by switching Value=0 and the newly added Value (e.g., Value=4). For example, when Value=0, the TCI state 0 corresponds to the CDM group 0 (containing the ports 0, 1, 4), while the TCI state 1 corresponds to the CDM group 1 (containing the ports 2, 3). When Value=4, the TCI state 0 corresponds to the CDM group 1 (containing the ports 2, 3), while the TCI state 1 corresponds to the CDM group 0 (containing the ports 0, 1, 4).

Case 6, when Rank=6, the allocated DMRS ports belong to two CDM groups, the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, while the TCI state 1 corresponds to the CDM group 1 (or the TCI state 0 corresponds to the CDM group 1, while the TCI state 1 corresponds to the CDM group 0).

Case 7, Rank=7.

When Rank=7 (two codewords are used at the moment), Value=2 occupies ports 0, 1, 2, 3, 4, 5, 6, and the ports 0/1/4/5 belong to the CDM group 0, while the ports 2/3/6 belong to the CDM group 1.

Manner 1, when Rank=7, adopting the manner 1 may add one Value, and corresponding to Table 7-1, in corresponding port allocation, three ports belong to the CDM group 0, while four ports belong to the CDM group 1. For example, port allocation corresponding to the added Value is ports 0, 1, 2, 3, 4, 6, 7, and the ports 0/1/4 belong to the CDM group 0, while the ports 2/3/6/7 belong to the CDM group 1.

Based on the pre-defined correspondence between the TCI states and the CDM groups, when the TCI field indicated in the DCI corresponds to two TCI states, the TCI state 0 corresponds to the CDM group 0, while the TCI state 1 corresponds to the CDM group 1.

When Rank=7, the Rank supported by each TRP may be dynamically fitted by switching Value=2 and the newly added Value (e.g., Value=5). For example, when Value=2, the TCI state 0 corresponds to the CDM group 0 (containing the ports 0, 1, 4, 5), while the TCI state 1 corresponds to the CDM group 1 (containing the ports 2, 3, 6). When Value=5, the TCI state 0 corresponds to the CDM group 1 (containing the ports 2, 3, 6, 7), while the TCI state 1 corresponds to the CDM group 0 (containing the ports 0, 1, 4).

Manner 2, when Rank=7 (two codewords are used at the moment), Value=2 occupies the ports 0, 1, 2, 3, 4, 5, 6, and the ports 0/1/4/5 belong to the CDM group 0, while the ports 2/3/6 belong to the CDM group 1. In the present application, for Rank=7, adopting the manner 2 may add one Value, and corresponding to Table 7-2, for Value=2, the mapping relationship between the CDM groups and the TCI states is pre-defined, for example, when the TCI field indicated in the DCI corresponds to two TCI states, the TCI state 0 corresponds to the CDM group 0, while the TCI state 1 corresponds to the CDM group 1.

Port allocation corresponding to the newly added Value (e.g., Value=5) is also 0, 1, 2, 3, 4, 5, 6, and meanwhile, for the newly added Value, the mapping relationship between the CDM groups and the TCI states is also pre-defined. For example, when the TCI field indicated in the DCI corresponds to two TCI states, the TCI state 1 corresponds to the CDM group 0, while the TCI state 0 corresponds to the CDM group 1.

When Rank=7, the Rank supported by each TRP may be dynamically fitted by switching Value=2 and the newly added Value (e.g., Value=5). For example, when Value=2, the TCI state 0 corresponds to the CDM group 0 (containing the ports 0, 1, 4, 5), while the TCI state 1 corresponds to the CDM group 1 (containing the ports 2, 3, 6). When Value=5, the TCI state 0 corresponds to the CDM group 1 (containing the ports 2, 3, 6), while the TCI state 1 corresponds to the CDM group 0 (containing the ports 0, 1, 4, 5).

Case 8, when Rank=8, the allocated DMRS ports belong to two CDM groups, the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, while the TCI state 1 corresponds to the CDM group 1 (or the TCI state 0 corresponds to the CDM group 1, while the TCI state 1 corresponds to the CDM group 0).

TABLE 7-1

Allocation manner of DMRS ports when at most two OFDM symbols are configured under DMRS pilot type 1 (Antenna port(s) (1000 + DMRS port), dmrs-Type = 1, maxLength = 2).

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4 | 2 | 0, 1, 2, 3, 6 | 2 |
| 5 | 2 | 2 | 1 | 5 | 2 | 0, 1, 2, 3, 4, 6, 7 | 2 |
| 6 | 2 | 3 | 1 | 6-31 | reserved | reserved | reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | 2 | 0, 2, 3 | 1 | | | | |

TABLE 7-2

Allocation manner of DMRS ports when at most two OFDM symbols are configured under DMRS pilot type 1 (Antenna port(s) (1000 + DMRS port), dmrs-Type = 1, maxLength = 2).

| | One codeword: Codeword 0 enabled, Codeword 1 disabled | | | Two Codewords: Codeword 0 enabled, Codeword 1 enabled | | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4 | 2 | 0-4 | 2 |
| 5 | 2 | 2 | 1 | 5 | 2 | 0, 1, 2, 3, 4, 5, 6 | 2 |
| 6 | 2 | 3 | 1 | 6-31 | reserved | reserved | reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | 2 | 0-2 | 1 | | | | |

(3) For Table 3, when the DMRS configuration type is 2, and the number of the front-load DMRS symbols is 1.

Case 1, when Rank=1, the allocated DMRS ports only belong to one CDM group (only one TCI state is needed at the moment), and when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Case 2, Rank=2.

First, when Rank=2, if the allocated DMRS ports only belong to one CDM group (only one TCI state is needed at the moment), when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Second, when Rank=2, if the allocated DMRS ports belong to two CDM groups, the number of the ports allocated in each CDM group is the same at the moment, the DMRS table does not need to be changed (new Values do not need to be added for this case), but the correspondence between the TCI states and the CDM groups needs to be determined. For example, it may be agreed that the TCI state 0 corresponds to the CDM group 0, and the TCI state 1 corresponds to the CDM group 1.

Case 3, Rank=3.

First, when Rank=3, the allocated DMRS ports belong to two CDM groups and the number of the CDM groups without data is 2, Value=9 occupies the ports 0/1/2, and the ports 0/1 correspond to the CDM group 0, while the port 2 corresponds to the CDM group 1.

Manner 1, when Rank=3 and the number of the CDM groups without data is 2, one Value is added by adopting the manner 1, and as shown in Table 8-1, in port allocation corresponding to the newly added Value, one port belongs to the CDM group 0, and remaining two ports belong to the CDM group 1. For example, port allocation corresponding to the added Value is the ports 0/2/3, and the port 0 belongs to the CDM group 0, while the ports 2/3 belong to the CDM group 1.

Based on the pre-defined correspondence between the TCI states and the CDM groups, for example, when the TCI field indicated in the DCI corresponds to two TCI states, the TCI state 0 corresponds to the CDM group 0, while the TCI state 1 corresponds to the CDM group 1.

The Rank supported by each TRP may be dynamically fitted by switching Value=9 and the newly added Value (e.g., Value=24). For example, when Value=9, the TCI state 0 corresponds to the CDM group 0 (containing the ports 0, 1), while the TCI state 1 corresponds to the CDM group 1 (containing the port 2). When Value=24, the TCI state 0 corresponds to the CDM group 0 (containing the port 0), while the TCI state 1 corresponds to the CDM group 1 (containing the ports 2, 3).

Manner 2, when Rank=3 and the number of the CDM groups without data is 2, a Value is added by adopting the manner 2, and as shown in Table 8-2, for Value=9, the mapping relationship between the CDM groups and the TCI states is pre-defined, for example, when the TCI field indicated in the DCI corresponds to two TCI states, the TCI state 0 corresponds to the CDM group 0, while the TCI state 1 corresponds to the CDM group 1.

Port allocation corresponding to the newly added Value (e.g., Value=24) is also the ports 0/1/2, and meanwhile, for the newly added Value, the mapping relationship between the CDM groups and the TCI states is also pre-defined, for example, when the TCI field indicated in the DCI corresponds to two TCI states, the TCI state 1 corresponds to the CDM group 0, while the TCI state 0 corresponds to the CDM group 1. When Rank=3, the Rank supported by each TRP may be dynamically fitted by switching Value=9 and the newly added Value (e.g., Value=24). For example, when Value=9, the TCI state 0 corresponds to the CDM group 0 (containing the ports 0, 1), while the TCI state 1 corresponds to the CDM group 1 (containing the port 2). When Value=24, the TCI state 0 corresponds to the CDM group 1 (containing the port 2), while the TCI state 1 corresponds to the CDM group 0 (containing the ports 0, 1).

Second, when Rank=3, the allocated DMRS ports belong to two CDM groups and the number of the CDM groups without data is 3, Value=20 corresponds to the case that two ports are allocated in the CDM group 0 while one port is allocated in the CDM group 1; and Value=21 corresponds to the case that one port is allocated in the CDM group 0 while two ports are allocated in the CDM group 1. At the moment, new Values do not need to be added, however, the correspondence between the TCI states and the CDM groups still needs to be pre-defined. When the TCI field indicated in the DCI corresponds to two TCI states, the TCI state 0 corresponds to the CDM group 0, while the TCI state 1 corresponds to the CDM group 1. The Rank supported by each TRP may be dynamically fitted by switching Value=20 and the newly added Value=21. For example, when Value=20, the TCI state 0 corresponds to the CDM group 0 (containing the ports 0, 1), while the TCI state 1 corresponds to the CDM group 1 (containing the port 2). When Value=21, the TCI state 0 corresponds to the CDM group 0 (containing the port 3), while the TCI state 1 corresponds to the CDM group 1 (containing the ports 4, 5).

Case 4, when Rank=4 (the allocated DMRS ports belong to two CDM groups), the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, while the TCI state 1 corresponds to the CDM group 1 (or the TCI state 0 corresponds to the CDM group 1, while the TCI state 1 corresponds to the CDM group 0).

Case 5, when Rank=5 (two codewords are used at the moment) (both the manner 1 and the manner 2 may be used, and description is made here only by taking the manner 2 as an example). Value=0 occupies the ports 0, 1, 2, 3, 4, and the ports 0, 1 belong to the CDM group 0, the ports 2, 3 belong to the CDM group 1, and the port 4 belong to a CDM group 2. In the present application, when Rank=5, the manner 2 may be adopted to add following Values (all or part), and Value=0 in the case of two codewords at present is constrained as follows.

The ports 0, 1, 2, 3, 4 are allocated when Value=0, and the TCI state 0 corresponds to the CDM group 0 (containing the ports 0, 1), and the TCI state 1 corresponds to the CDM groups 1/2 (containing the ports 2/3/4).

A Value (e.g., Value=2) is added, and the CDM group corresponding to the TCI state 0 contains three ports, and the CDM group corresponding to the TCI state 1 contains two ports. For example, the ports 0, 1, 2, 3, 4 are allocated when Value=2, and the TCI state 0 corresponds to the CDM groups 1/2 (containing the ports 2/3/4), and the TCI state 1 corresponds to the CDM group 0 (containing the ports 0/1).

A Value (e.g., Value=3) is added, and the CDM group corresponding to the TCI state 0 contains one port, and the CDM group corresponding to the TCI state 1 contains four ports. For example, the ports 0, 1, 2, 3, 4 are allocated when Value=3, and the TCI state 0 corresponds to the CDM group 2 (containing the port 4), and the TCI state 1 corresponds to the CDM groups 0/1 (containing ports 0/1/2/3).

A Value (e.g., Value=4) is added, and the CDM group corresponding to the TCI state 0 contains four ports, and the CDM group corresponding to the TCI state 1 contains one port. For example, the ports 0, 1, 2, 3, 4 are allocated when Value=4, and the TCI state 0 corresponds to the CDM groups 0/1 (containing the ports 0/1/2/3), and the TCI state 1 corresponds to the CDM group 2 (containing the port 4).

When Rank=5, the Rank supported by each TRP may be dynamically fitted by switching Value=0 and the above newly added Values (e.g., Value=2/3/4).

Case 6, when Rank=6 (two codewords are used at the moment) (both the manner 1 and the manner 2 may be used, and description is made here only by taking the manner 2 as an example). The ports 0, 1, 2, 3, 4, 5 are allocated when Value=1, and the ports 0, 1 belong to the CDM group 0, the ports 2, 3 belong to the CDM group 1, and the ports 4/5 belong to the CDM group 2. In the present application, when Rank=6, adopting the manner 2 may add following Values, and Value=1 in the case of two codewords at present is constrained as follows.

The ports 0, 1, 2, 3, 4, 5 are allocated when Value=1, and the TCI state 0 corresponds to the CDM group 0 (containing the ports 0, 1), and the TCI state 1 corresponds to the CDM groups 1/2 (containing the ports 2/3/4/5).

A Value (e.g., Value=5) is added, and the CDM group corresponding to the TCI state 0 contains four ports, and the CDM group corresponding to the TCI state 1 contains two ports. For example, the ports 0, 1, 2, 3, 4, 5 are allocated when Value=5, and the TCI state 0 corresponds to the CDM groups 1/2 (containing the ports 2, 3, 4, 5), and the TCI state 1 corresponds to the CDM group 0 (containing the ports 0, 1).

When Rank=6, the Rank supported by each TRP is dynamically fitted by switching Value=1 and the above newly added Values (e.g., Value=5).

TABLE 8-1

Allocation manner of DMRS ports when only one
OFDM symbol is configured under DMRS pilot
type 2 (Antenna port(s) (1000 + DMRS port),
dmrs-Type = 2, maxLength = 1).

| One codeword: Codeword 0 enabled, Codeword 1 disabled | | | Two codewords: Codeword 0 enabled, Codeword 1 enabled | | |
|---|---|---|---|---|---|
| Value | Number of CDM group(s) without data | DMRS port(s) | Value | Number of CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2 | 3 | 0-4 |
| 3 | 2 | 0 | 3 | 3 | 0-4 |
| 4 | 2 | 1 | 4 | 3 | 0-4 |
| 5 | 2 | 2 | 5 | 3 | 0-5 |
| 6 | 2 | 3 | 6-31 | reserved | reserved |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24 | 2 | 0, 2, 3 | | | |
| 25-31 | Reserved | Reserved | | | |

TABLE 8-2

Allocation manner of DMRS ports when only one
OFDM symbol is configured under DMRS pilot
type 2 (Antenna port(s) (1000 + DMRS port),
dmrs-Type = 2, maxLength = 1).

| One codeword: Codeword 0 enabled, Codeword 1 disabled | | | Two codewords: Codeword 0 enabled, Codeword 1 enabled | | |
|---|---|---|---|---|---|
| Value | Number of CDM group(s) without data | DMRS port(s) | Value | Number of CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2 | 3 | 0-4 |
| 3 | 2 | 0 | 3 | 3 | 0-4 |
| 4 | 2 | 1 | 4 | 3 | 0-4 |
| 5 | 2 | 2 | 5 | 3 | 0-5 |
| 6 | 2 | 3 | 6-31 | reserved | reserved |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24 | 2 | 0-2 | | | |
| 25-31 | Reserved | Reserved | | | |

(2) For Table 2, the situation is that the DMRS configuration type is 2, and the number of the front-load DMRS symbols is 2.

Case 1, when Rank=1, the allocated DMRS ports only belong to one CDM group (only one TCI state is needed at the moment), and when the TCI field indicated by the DCI corresponds to two TCI states, a pre-defined correspondence between the TCI states and the CDM groups may be the basis. For example, the TCI state 0 corresponds to the CDM group, or the TCI state 1 corresponds to the CDM group.

Case 2, Rank=2.

First, when Rank=2, the allocated DMRS ports only belong to one CDM group (only one TCI state is needed at the moment) and the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Second, when Rank=2, if the allocated DMRS ports belong to two CDM groups, the number of the ports allocated in each CDM group is the same at the moment, the DMRS table does not need to be changed (new Values do not need to be added for this case), but the correspondence between the TCI states and the CDM groups needs to be determined. For example, it may be agreed that the TCI state 0 corresponds to the CDM group 0, and the TCI state 1 corresponds to the CDM group 1.

Case 3, Rank=3.

First, when Rank=3, the allocated DMRS ports belong to two CDM groups and the number of the CDM groups without data is 2, Value=9 occupies the ports 0/1/2, and the ports 0/1 correspond to the CDM group 0, while the port 2 corresponds to the CDM group 1.

Manner 1, when Rank=3 and the number of the CDM groups without data is 2, one Value is added by adopting the manner 1, and as shown in Table 9-1, in port allocation corresponding to the newly added Value, one port belongs to the CDM group 0, and remaining two ports belong to the CDM group 1. For example, port allocation corresponding to the added Value is the ports 0/2/3, and the port 0 belongs to the CDM group 0, while the ports 2/3 belong to the CDM group 1.

Based on the pre-defined correspondence between the TCI states and the CDM groups, for example, when the TCI field indicated in the DCI corresponds to two TCI states, the TCI state 0 corresponds to the CDM group 0, while the TCI state 1 corresponds to the CDM group 1.

The Rank supported by each TRP may be dynamically fitted by switching Value=9 and the newly added Value (e.g., Value=24). For example, when Value=9, the TCI state 0 corresponds to the CDM group 0 (containing the ports 0, 1), while the TCI state 1 corresponds to the CDM group 1 (containing the port 2). When Value=24, the TCI state 0 corresponds to the CDM group 0 (containing the port 0), while the TCI state 1 corresponds to the CDM group 1 (containing the ports 2, 3).

Manner 2, when Rank=3, the allocated DMRS ports belong to two CDM groups and the number of the CDM groups without data is 2, Value=9 occupies the ports 0/1/2, and the ports 0/1 correspond to the CDM group 0, while the port 2 corresponds to the CDM group 1. When Rank=3 and the number of the CDM groups without data is 2, a Value is added by adopting the manner 2, and as shown in Table 9-2, for Value=9, the mapping relationship between the CDM groups and the TCI states is pre-defined, for example, when the TCI field indicated in the DCI corresponds to two TCI states, the TCI state 0 corresponds to the CDM group 0, while the TCI state 1 corresponds to the CDM group 1.

Port allocation corresponding to the newly added Value (e.g., Value=24) is also the ports 0/1/2, and meanwhile, for the newly added Value, the mapping relationship between the CDM groups and the TCI states is also pre-defined, for example, when the TCI field indicated in the DCI corresponds to two TCI states, the TCI state 1 corresponds to the CDM group 0, while the TCI state 0 corresponds to the CDM group 1.

When Rank=3, the Rank supported by each TRP may be dynamically fitted by switching Value=9 and the newly added Value (e.g., Value=24). For example, when Value=9, the TCI state 0 corresponds to the CDM group 0 (containing the ports 0, 1), while the TCI state 1 corresponds to the CDM group 1 (containing the port 2). When Value=24, the TCI state 0 corresponds to the CDM group 1 (containing the port 2), while the TCI state 1 corresponds to the CDM group 0 (containing the ports 0, 1).

Second, when Rank=3, the allocated DMRS ports belong to two CDM groups and the number of the CDM groups without data is 3, Value=20 corresponds to the case that two ports are allocated in the CDM group 0 while one port is allocated in the CDM group 1; and Value=21 corresponds to the case that one port is allocated in the CDM group 0 while two ports are allocated in the CDM group 1. At the moment, new Values do not need to be added, however, the correspondence between the TCI states and the CDM groups still needs to be pre-defined. When the TCI field indicated in the DCI corresponds to two TCI states, the TCI state 0 corresponds to the CDM group 0, while the TCI state 1 corresponds to the CDM group 1. The Rank supported by each TRP may be dynamically fitted by switching Value=20 and the newly added Value=21. For example, when Value=20, the TCI state 0 corresponds to the CDM group 0 (containing the ports 0, 1), while the TCI state 1 corresponds to the CDM group 1 (containing the port 2). When Value=21, the TCI state 0 corresponds to the CDM group 0 (containing the port 3), while the TCI state 1 corresponds to the CDM group 1 (containing the ports 4, 5).

Third, when Rank=3, if the allocated DMRS ports only belong to one CDM group (only one TCI state is needed at the moment), when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Case 4, Rank=4.

First, when Rank=4, if the allocated DMRS ports only belong to one CDM group (only one TCI state is needed at the moment), when the TCI field indicated by the DCI corresponds to two TCI states, the pre-defined correspondence between the TCI states and the CDM groups may be the basis. For example, the TCI state 0 corresponds to the CDM group, or the TCI state 1 corresponds to the CDM group.

Second, when Rank=4 (the allocated DMRS ports belong to two CDM groups), the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, while the TCI state 1 corresponds to the CDM group 1 (or the TCI state 0 corresponds to the CDM group 1, while the TCI state 1 corresponds to the CDM group 0).

Case 5, when Rank=5 (two codewords are used at the moment) and the allocated DMRS ports belong to three CDM groups (both the manner 1 and the manner 2 may be used, and description is made here only by taking the manner 2 as an example). Value=0 occupies the ports 0, 1, 2, 3, 4, and the ports 0, 1 belong to the CDM group 0, the ports 2, 3 belong to the CDM group 1, and the port 4 belongs to a CDM group 2. In the present application, when Rank=5, the manner 2 may be adopted to add following Values (all or part), and Value=0 in the case of two codewords at present is constrained as follows.

The ports 0, 1, 2, 3, 4 are allocated when Value=0, and the TCI state 0 corresponds to the CDM group 0 (containing the ports 0, 1), and the TCI state 1 corresponds to the CDM groups 1/2 (containing the ports 2/3/4) (or the TCI state 0 corresponds to the CDM group 1, while the TCI state 1 corresponds to the CDM group 0).

A Value (e.g., Value=6) is added, and the CDM group corresponding to the TCI state 0 contains three ports, and the CDM group corresponding to the TCI state 1 contains two ports. For example, the ports 0, 1, 2, 3, 4 are allocated when Value=2, and the TCI state 0 corresponds to the CDM groups 1/2 (containing the ports 2/3/4), and the TCI state 1 corresponds to the CDM group 0 (containing the ports 0/1) (or the TCI state 0 corresponds to the CDM group 1, while the TCI state 1 corresponds to the CDM group 0).

A Value (e.g., Value=7) is added, and the CDM group corresponding to the TCI state 0 contains one port, and the CDM group corresponding to the TCI state 1 contains four ports. For example, the ports 0, 1, 2, 3, 4 are allocated when Value=7, and the TCI state 0 corresponds to the CDM group 2 (containing the port 4), and the TCI state 1 corresponds to the CDM groups 0/1 (containing the ports 0/1/2/3) (or the TCI state 0 corresponds to the CDM group 1, while the TCI state 1 corresponds to the CDM group 0).

A Value (e.g., Value=8) is added, and the CDM group corresponding to the TCI state 0 contains four ports, and the CDM group corresponding to the TCI state 1 contains one port. For example, the ports 0, 1, 2, 3, 4 are allocated when Value=4, and the TCI state 0 corresponds to the CDM groups 0/1 (containing the ports 0/1/2/3), and the TCI state 1 corresponds to the CDM group 2 (containing the port 4) (or the TCI state 0 corresponds to the CDM group 1, while the TCI state 1 corresponds to the CDM group 0).

When Rank=5, the Rank supported by each TRP may be dynamically fitted by switching Value=0 and the above newly added Values (e.g., Value=6/7/8).

When Rank=5 (two codewords are used at the moment) and the allocated DMRS ports belong to two CDM groups (both the manner 1 and the manner 2 may be used, and description is made here only by taking the manner 1 as an example). The ports 0, 1, 2, 3, 6 are allocated when Value=2, and the ports 0, 1, 6 belong to the CDM group 0, while the ports 2, 3 belong to the CDM group 1. In the present application, following Values (all or part) may be added for the case of Rank=5, and Value=2 in the case of two codewords at present is constrained as follows.

The ports 0, 1, 2, 3, 6 are allocated when Value=2, and the TCI state 0 corresponds to the CDM group 0 (containing the ports 0, 1, 6), and the TCI state 1 corresponds to the CDM group 1 (containing the ports 2/3).

A Value (e.g., Value=9) is added, and the CDM group corresponding to the TCI state 0 contains three ports, and the CDM group corresponding to the TCI state 1 contains two ports. For example, the ports 0, 1, 2, 3, 8 are allocated when Value=9, and the TCI state 0 corresponds to the CDM group 0 (containing the ports 0, 1), and the TCI state 1 corresponds to the CDM group 1 (containing the ports 2, 3, 8).

When Rank=5, the Rank supported by each TRP may be dynamically fitted by switching Value=2 and the above newly added Values (e.g., Value=9).

Case 6, Rank=6 (two codewords are used at the moment).

First, when Rank=6 (two codewords are used at the moment) and the allocated DMRS ports belong to three CDM groups (both the manner 1 and the manner 2 may be used, and description is made here only by taking the manner 2 as an example).

The ports 0, 1, 2, 3, 4, 5 are allocated when Value=1, and the ports 0, 1 belong to the CDM group 0, the ports 2, 3 belong to the CDM group 1, and the ports 4/5 belong to the CDM group 2. In the present application, following Values may be added for the case of Rank=6, and Value=1 in the case of two codewords at present is constrained as follows.

The ports 0, 1, 2, 3, 4, 5 are allocated when Value=1, and the TCI state 0 corresponds to the CDM group 0 (containing the ports 0, 1), and the TCI state 1 corresponds to the CDM groups 1/2 (containing the ports 2/3/4/5).

A Value (e.g., Value=10) is added, and the CDM group corresponding to the TCI state 0 contains four ports, and the CDM group corresponding to the TCI state 1 contains two ports. For example, the ports 0, 1, 2, 3, 4, 5 are allocated when Value=10, and the TCI state 0 corresponds to the CDM groups 1/2 (containing the ports 2, 3, 4, 5), and the TCI state 1 corresponds to the CDM group 0 (containing the ports 0, 1).

When Rank=6, the Rank supported by each TRP is dynamically fitted by switching Value=1 and the above newly added Values (e.g., Value=10).

Second, when Rank=6 (two codewords are used at the moment) and the allocated DMRS ports belong to two CDM groups, the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, while the TCI state 1 corresponds to the CDM group 1 (or the TCI state 0 corresponds to the CDM group 1, while the TCI state 1 corresponds to the CDM group 0).

Case 7, when Rank=7 (two codewords are used at the moment) (both the manner 1 and the manner 2 may be used, and description is made here only by taking the manner 1 as an example), the ports 0, 1, 2, 3, 6, 7, 8 are allocated when Value=4, and the ports 0, 1, 6, 7 belong to the CDM group 0, and the ports 2, 3, 8 belong to the CDM group 1. In the present application, following Values may be added for the case of Rank=7, and Value=4 in the case of two codewords at present is constrained as follows.

The ports 0, 1, 2, 3, 6, 7, 8 are allocated when Value=4, and the TCI state 0 corresponds to the CDM group 0 (containing the ports 0, 1, 6, 7), and the TCI state 1 corresponds to the CDM group 1 (containing the ports 2/3/8).

A Value (e.g., Value=11) is added, and the CDM group corresponding to the TCI state 0 contains three ports, and the CDM group corresponding to the TCI state 1 contains four ports. For example, the ports 0, 1, 2, 3, 6, 8, 9 are allocated when Value=11, and the TCI state 0 corresponds to the CDM group 0 (containing the ports 0, 1, 6), and the TCI state 1 corresponds to the CDM group 1 (containing the ports 2, 3, 8, 9).

When Rank=7, the Rank supported by each TRP is dynamically fitted by switching Value=4 and the above newly added Values (e.g., Value=11).

Case 8, when Rank=8 (two codewords are used at the moment), the number of the ports allocated in each CDM group is the same, the DMRS table does not need to be changed (new Values do not need to be added for this case), but the correspondence between the TCI states and the CDM groups needs to be determined. For example, it may be agreed that the TCI state 0 corresponds to the CDM group 0, while the TCI state 1 corresponds to the CDM group 1 (or the TCI state 0 corresponds to the CDM group 1, while the TCI state 1 corresponds to the CDM group 0).

TABLE 9-1

Allocation manner of DMRS ports when at most two OFDM symbols are configured under DMRS pilot type 2 (Antenna port(s) (1000 + DMRS port), dmrs-Type = 2, maxLength = 2).

| | One codeword: Codeword 0 enabled, Codeword 1 disabled | | | | Two Codewords: Codeword 0 enabled, Codeword 1 enabled | | |
| --- | --- | --- | --- | --- | --- | --- | --- |
| Value | Number of CDM group(s) without data | DMRS port(s) | Number of front-load symbols | Value | Number of CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |

TABLE 9-1-continued

Allocation manner of DMRS ports when at most two OFDM symbols are configured under DMRS pilot type 2 (Antenna port(s) (1000 + DMRS port), dmrs-Type = 2, maxLength = 2).

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 3 | 2 | 0 | 1 | 3 | 2 | 0, 1, 2, 3, 6, 8 | 2 |
| 4 | 2 | 1 | 1 | 4 | 2 | 0, 1, 2, 3 6 7, 8 | 2 |
| 5 | 2 | 2 | 1 | 5 | 2 | 0, 1, 2, 3, 6, 7, 8, 9 | 2 |
| 6 | 2 | 3 | 1 | 6 | 3 | 0-4 | 1 |
| 7 | 2 | 0, 1 | 1 | 7 | 3 | 0-4 | 1 |
| 8 | 2 | 2, 3 | 1 | 8 | 3 | 0-4 | 1 |
| 9 | 2 | 0-2 | 1 | 9 | 2 | 0, 1, 2, 3, 8 | 2 |
| 10 | 2 | 0-3 | 1 | 10 | 3 | 0-5 | 1 |
| 11 | 3 | 0 | 1 | 11 | 2 | 0, 1, 2, 3, 6, 8, 9 | 2 |
| 12 | 3 | 1 | 1 | 12-63 | Reserved | Reserved | Reserved |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58 | 2 | 0, 2, 3 | 1 | | | | |
| 59-63 | Reserved | Reserved | Reserved | | | | |

TABLE 9-2

Allocation manner of DMRS ports when at most two OFDM symbols are configured under DMRS pilot type 2 (Antenna port(s) (1000 + DMRS port), dmrs-Type = 2, maxLength = 2).

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6 | 3 | 0-4 | 1 |
| 7 | 2 | 0, 1 | 1 | 7 | 3 | 0-4 | 1 |
| 8 | 2 | 2, 3 | 1 | 8 | 3 | 0-4 | 1 |
| 9 | 2 | 0-2 | 1 | 9 | 2 | 0, 1, 2, 3, 8 | 2 |
| 10 | 2 | 0-3 | 1 | 10 | 3 | 0-5 | 1 |
| 11 | 3 | 0 | 1 | 11 | 2 | 0, 1, 2, 3, 6, 8, 9 | 2 |
| 12 | 3 | 1 | 1 | 12-63 | Reserved | Reserved | Reserved |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |

TABLE 9-2-continued

Allocation manner of DMRS ports when at most two OFDM symbols are configured under DMRS pilot type 2 (Antenna port(s) (1000 + DMRS port), dmrs-Type = 2, maxLength = 2).

| | One codeword: Codeword 0 enabled, Codeword 1 disabled | | | Two Codewords: Codeword 0 enabled, Codeword 1 enabled | | | |
|---|---|---|---|---|---|---|---|
| Value | Number of CDM group(s) without data | DMRS port(s) | Number of front-load symbols | Value | Number of CDM group(s) without data | DMRS port(s) | Number of front-load symbols |
| 57 | 2 | 8, 9 | 2 | | | | |
| 58 | 2 | 0-2 | 1 | | | | |
| 59-63 | Reserved | Reserved | Reserved | | | | |

Operations of the network side device are described above, for a terminal side, the terminal receives the DCI sent by the network side device, and then determines the set of DMRS ports allocated by the network side device to the terminal, the number of the CDM groups without data and the mapping relationship between the TCI states and the CDM groups according to the Values and the port allocation table.

In an embodiment, the terminal may determine the mapping relationship, corresponding to the Value, between the TCI states and the CDM groups according to a pre-definition. The mapping relationship, corresponding to the Value, between the TCI states and the CDM groups is the same at the terminal side and a network side, which is not repeated here.

Referring to FIG. 3, FIG. 3 is a network side device provided by an embodiment of the present application. The network side device includes: at least one processor 800, at least one memory 801, a transceiver 802 and a bus interface. The processor 800 is responsible for managing the bus architecture and general processing, and the memory 801 may store data used when the processor 800 executes operations. The transceiver 802 is configured to receive and send data under the control of the processor 800. The memory 801 stores program codes, and when the program codes are executed by the processor 800, the processor 800 is made to execute the following process: at least two DMRS ports are configured for a terminal according to a required mapping relationship between TCI states and CDM groups, and the at least two DMRS ports belong to different DMRS CDM groups, and the quantities of the DMRS ports included in the different CDM groups are not exactly the same; and DCI is sent to the terminal, and the DCI includes DMRS port index values Values, the Values are Values pre-defined in a DMRS port allocation table, and the Values are used to indicate a set of the at least two DMRS ports allocated to the terminal and the number of CDM groups without data, and are used to indicate the mapping relationship between the TCI states and the CDM groups.

In one embodiment, at least one first parameter combination is formed by a DMRS pilot type, a maximum number of front-load DMRS symbols being 1, the number of CDM groups without data and the total number of DMRS ports. For each first parameter combination, if a TCI field in the DCI corresponds to at least two TCI states, at least two Values corresponding to that first parameter combination correspond to the same mapping relationship between the TCI states and the CDM groups.

In one embodiment, at least one second parameter combination is formed by a DMRS pilot type, a maximum number of front-load DMRS symbols being 2, the number of actually used DMRS symbols, the number of CDM groups without data and the total number of DMRS ports. For each second parameter combination, if a TCI field in the DCI corresponds to at least two TCI states, at least two Values corresponding to that second parameter combination correspond to the same mapping relationship between the TCI states and the CDM groups.

In one embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In one embodiment, at least one first parameter combination is formed by a DMRS pilot type, a maximum number of front-load DMRS symbols being 1, the number of the CDM groups without data and the total number of DMRS ports. For each first parameter combination, if a TCI field in the DCI corresponds to at least two TCI states, the mapping relationships, corresponding to the at least two Values corresponding to that first parameter combination, between the TCI states and the CDM groups are different.

In one embodiment, at least one second parameter combination is formed by a DMRS pilot type, a maximum number of front-load DMRS symbols being 2, the number of actually used DMRS symbols, the number of the CDM groups without data and the total number of DMRS ports. For each second parameter combination, if a TCI field in the DCI corresponds to at least two TCI states, the mapping relationships, corresponding to the at least two Values corresponding to that first parameter combination, between the TCI states and the CDM groups are different.

In one embodiment, port numbers corresponding to the Values corresponding to each first parameter combination are the same; and/or, port numbers corresponding to the Values corresponding to each second parameter combination are the same.

Referring to FIG. 4, FIG. 4 is a network side device provided by an embodiment of the present application. The network side device includes: at least one processor 900, at least one memory 901, a transceiver 902 and a bus interface. The processor 900 is responsible for managing the bus architecture and general processing, and the memory 901 may store data used when the processor 900 executes operations. The transceiver 902 is configured to receive and send data under the control of the processor 900. The memory 901 stores program codes, and when the program codes are executed by the processor 900, the processor 900 is made to execute the following process: DCI sent by the network side device is received, and the DCI includes DMRS port index values Values, and the Values are Values pre-defined in a DMRS port allocation table; and a set of DMRS ports allocated by the network side device to a terminal, the number of CDM groups without data and a mapping relationship between TCI states and CDM groups are determined according to the Values and the port allocation table, and at least two DMRS ports included in the port set belong to different DMRS CDM groups, the quantities of the DMRS ports included in the different CDM groups are not exactly the same, and the at least two ports are determined by the network side device according to a required mapping relationship between the TCI states and the CDM groups.

In one embodiment, the processor is further configured to execute: determining the mapping relationship, corresponding to the Values, between the TCI states and the CDM groups according to a pre-definition.

In one embodiment, at least one first parameter combination is formed by a DMRS pilot type, a maximum number of front-load DMRS symbols being 1, the number of CDM groups without data and the total number of DMRS ports. For each first parameter combination, if a TCI field in the DCI corresponds to at least two TCI states, at least two Values corresponding to that first parameter combination correspond to the same mapping relationship between the TCI states and the CDM groups.

In one embodiment, at least one second parameter combination is formed by a DMRS pilot type, a maximum number of front-load DMRS symbols being 2, the number of actually used DMRS symbols, the number of CDM groups without data and the total number of DMRS ports. For each second parameter combination, if a TCI field in the DCI corresponds to at least two TCI states, at least two Values corresponding to that second parameter combination correspond to the same mapping relationship between the TCI states and the CDM groups.

In one embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In one embodiment, at least one first parameter combination is formed by a DMRS pilot type, a maximum number of front-load DMRS symbols being 1, the number of the CDM groups without data and the total number of DMRS ports. For each first parameter combination, if a TCI field in the DCI corresponds to at least two TCI states, the mapping relationships, corresponding to the at least two Values corresponding to that first parameter combination, between the TCI states and the CDM groups are different.

In one embodiment, at least one second parameter combination is formed by a DMRS pilot type, a maximum number of front-load DMRS symbols being 2, the number of actually used DMRS symbols, the number of the CDM groups without data and the total number of DMRS ports. For each second parameter combination, if a TCI field in the DCI corresponds to at least two TCI states, the mapping relationships, corresponding to the at least two Values corresponding to that first parameter combination, between the TCI states and the CDM groups are different.

In one embodiment, port numbers corresponding to the Values corresponding to each first parameter combination are the same; and/or, port numbers corresponding to the Values corresponding to each second parameter combination are the same.

Referring to FIG. 5, FIG. 5 is a schematic flow diagram of a transmission configuration indication method of a DMRS port provided by an embodiment of the present application. The method includes the following.

Step 501: a network side device configures at least two DMRS ports for a terminal according to a required mapping relationship between TCI states and CDM groups, and the at least two DMRS ports belong to different DMRS CDM groups, and the quantities of the DMRS ports included in the different CDM groups are not exactly the same.

Step 502, DCI is sent to the terminal, and the DCI includes DMRS port index values (Values), the Values are Values pre-defined in a DMRS port allocation table, and the Values are used to indicate a set of DMRS ports allocated to the terminal and the number of CDM groups without data, and used to indicate the mapping relationship between the TCI states and the CDM groups.

In an embodiment, at least one first parameter combination is formed by a DMRS pilot type, a maximum number of front-load DMRS symbols being 1, the number of the CDM groups without data and the total number of the DMRS ports. For each first parameter combination, if a TCI field in the DCI corresponds to at least two TCI states, at least two Values corresponding to that first parameter combination correspond to the same mapping relationship between the TCI states and the CDM groups.

In an embodiment, at least one second parameter combination is formed by a DMRS pilot type, a maximum number of front-load DMRS symbols being 2, the number of actually used DMRS symbols, the number of the CDM groups without data and the total number of the DMRS ports. For each second parameter combination, if a TCI field in the DCI corresponds to at least two TCI states, at least two Values corresponding to that second parameter combination correspond to the same mapping relationship between the TCI states and the CDM groups.

In an embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In an embodiment, at least one first parameter combination is formed by the DMRS pilot type, the maximum number of the front-load DMRS symbols being 1, the number of the CDM groups without data and the total number of the DMRS ports. For each first parameter combination, if the TCI field in the DCI corresponds to at least two TCI states, the mapping relationships, corresponding to the at least two Values corresponding to that first parameter combination, between the TCI states and the CDM groups are different.

In an embodiment, at least one second parameter combination is formed by the DMRS pilot type, the maximum number of the front-load DMRS symbols being 2, the number of the actually used DMRS symbols, the number of the CDM groups without data and the total number of the DMRS ports. For each second parameter combination, if the TCI field in the DCI corresponds to at least two TCI states, the mapping relationships, corresponding to the at least two Values corresponding to that second parameter combination, between the TCI states and the CDM groups are different.

In an embodiment, port numbers corresponding to the Values corresponding to each first parameter combination are the same; and/or, port numbers corresponding to the Values corresponding to each second parameter combination are the same.

Figure 6:
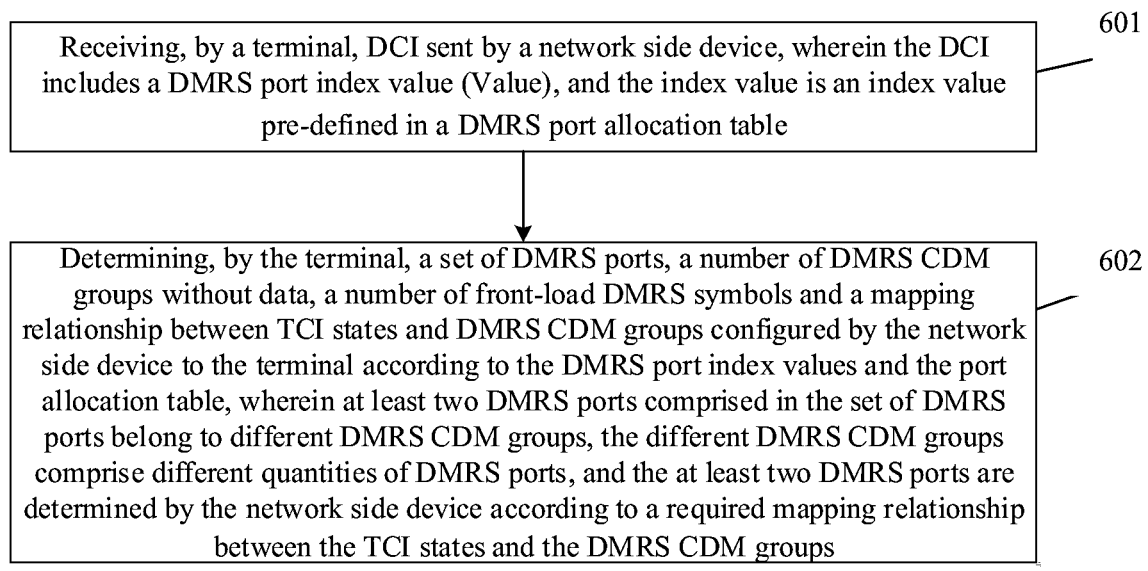
FIG. 6 is another schematic flow diagram of a transmission configuration indication method of a DMRS port provided by an embodiment of the present application.

Referring to FIG. 6, FIG. 6 is a schematic flow diagram of a transmission configuration indication method of a DMRS port suitable for a terminal provided by an embodiment of the present application. As shown in FIG. 6, the method includes the following.

Step 601: the terminal receives DCI sent by a network side device, and the DCI includes DMRS port index values (Values), and the Values are Values pre-defined in a DMRS port allocation table.

Step 602: a set of DMRS ports allocated by the network side device to the terminal, the number of CDM groups without data and a mapping relationship between TCI states and CDM groups are determined according to the Values and the port allocation table, and at least two DMRS ports included in the port set belong to different DMRS CDM groups, the quantities of the DMRS ports included in the different CDM groups are not exactly the same, and the at least two ports are determined by the network side device according to a required mapping relationship between the TCI states and the CDM groups.

In an embodiment, determining the mapping relationship between the TCI states and the CDM groups according to the Values, includes: the mapping relationship, corresponding to the Values, between the TCI states and the CDM groups is determined according to a pre-definition.

In an embodiment, at least one first parameter combination is formed by a DMRS pilot type, a maximum number of front-load DMRS symbols being 1, the number of the CDM groups without data and the total number of the DMRS ports. For each first parameter combination, if a TCI field in the DCI corresponds to at least two TCI states, at least two Values corresponding to that first parameter combination correspond to the same mapping relationship between the TCI states and the CDM groups.

In an embodiment, at least one second parameter combination is formed by a DMRS pilot type, a maximum number of front-load DMRS symbols being 2, the number of actually used DMRS symbols, the number of the CDM groups without data and the total number of the DMRS ports. For each second parameter combination, if a TCI field in the DCI corresponds to at least two TCI states, at least two Values corresponding to that second parameter combination correspond to the same mapping relationship between the TCI states and the CDM groups.

In an embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In an embodiment, at least one first parameter combination is formed by the DMRS pilot type, the maximum number of the front-load DMRS symbols being 1, the number of the CDM groups without data and the total number of the DMRS ports. For each first parameter combination, if the TCI field in the DCI corresponds to at least two TCI states, the mapping relationships, corresponding to the at least two Values corresponding to that first parameter combination, between the TCI states and the CDM groups are different.

In an embodiment, at least one second parameter combination is formed by the DMRS pilot type, the maximum number of the front-load DMRS symbols being 2, the number of the actually used DMRS symbols, the number of the CDM groups without data and the total number of the DMRS ports. For each second parameter combination, if the TCI field in the DCI corresponds to at least two TCI states, the mapping relationships, corresponding to the at least two Values corresponding to that second parameter combination, between the TCI states and the CDM groups are different.

In an embodiment, port numbers corresponding to the Values corresponding to each first parameter combination are the same; and/or, port numbers corresponding to the Values corresponding to each second parameter combination are the same.

Figure 7:
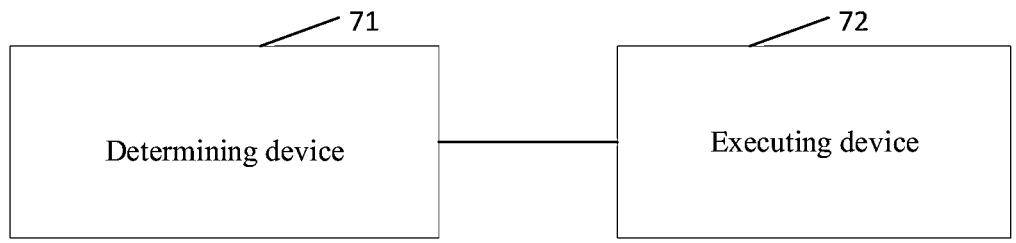
FIG. 7 is a schematic structural diagram of a network side device provided by an embodiment of the present application.

Referring to FIG. 7, FIG. 7 is a schematic structural diagram of a network side device provided by the present application. The network side device includes: a determining device 71, configured to configure at least two DMRS ports for a terminal according to a required mapping relationship between TCI states and CDM groups, and the at least two DMRS ports belong to different DMRS CDM groups, and the quantities of the DMRS ports included in the different CDM groups are not exactly the same; and an executing device 72, configured to send DCI to the terminal, and the DCI includes DMRS port index values (Value)s, the Values are Values pre-defined in a DMRS port allocation table, and the Values are used to indicate a set of DMRS ports allocated to the terminal and the number of CDM groups without data, and used to indicate the mapping relationship between the TCI states and the CDM groups.

In one embodiment, at least one first parameter combination is formed by a DMRS pilot type, a maximum number of front-load DMRS symbols being 1, the number of the CDM groups without data and the total number of the DMRS ports. For each first parameter combination, if a TCI field in the DCI corresponds to at least two TCI states, at least two Values corresponding to that first parameter combination correspond to the same mapping relationship between the TCI states and the CDM groups.

In one embodiment, at least one second parameter combination is formed by a DMRS pilot type, a maximum number of front-load DMRS symbols being 2, the number of actually used DMRS symbols, the number of the CDM groups without data and the total number of DMRS ports. For each second parameter combination, if a TCI field in the DCI corresponds to at least two TCI states, at least two Values corresponding to that second parameter combination correspond to the same mapping relationship between the TCI states and the CDM groups.

In one embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In one embodiment, at least one first parameter combination is formed by a DMRS pilot type, a maximum number of front-load DMRS symbols being 1, the number of the CDM groups without data and the total number of DMRS ports. For each first parameter combination, if a TCI field in the DCI corresponds to at least two TCI states, the mapping relationships, corresponding to the at least two Values corresponding to that first parameter combination, between the TCI states and the CDM groups are different.

In one embodiment, at least one second parameter combination is formed by a DMRS pilot type, a maximum number of front-load DMRS symbols being 2, the number of actually used DMRS symbols, the number of the CDM groups without data and the total number of DMRS ports. For each second parameter combination, if a TCI field in the DCI corresponds to at least two TCI states, the mapping relationships, corresponding to the at least two Values corresponding to that first parameter combination, between the TCI states and the CDM groups are different.

In one embodiment, port numbers corresponding to the Values corresponding to each first parameter combination are the same; and/or, port numbers corresponding to the Values corresponding to each second parameter combination are the same.

Figure 8:
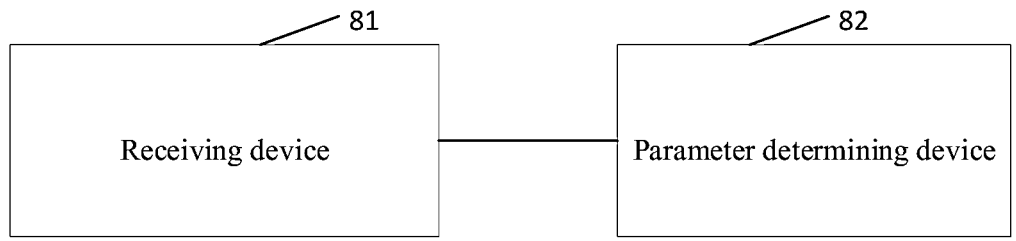
FIG. 8 is a schematic structural diagram of a terminal provided by an embodiment of the present application.

Referring to FIG. 8, FIG. 8 is a schematic structural diagram of a terminal provided by an embodiment of the present application. The terminal includes: a receiving device 81, configured to receive DCI sent by a network side device, and the DCI includes DMRS port index values (Values), and the Values are Values pre-defined in a DMRS port allocation table; and a parameter determining device 82, configured to determine a set of DMRS ports allocated by the network side device to the terminal, the number of CDM groups without data and a mapping relationship between TCI states and CDM groups according to the Values and the port allocation table, and at least two DMRS ports included in the port set belong to different DMRS CDM groups, the quantities of the DMRS ports included in the different CDM groups are not exactly the same, and the at least two DMRS ports are determined by the network side device according to a required mapping relationship between the TCI states and the CDM groups.

In one embodiment, the parameter determining device 82 is configured to determine the mapping relationship, corresponding to the Values, between the TCI states and the CDM groups according to a pre-definition.

In one embodiment, at least one first parameter combination is formed by a DMRS pilot type, a maximum number of front-load DMRS symbols being 1, the number of the CDM groups without data and the total number of DMRS ports. For each first parameter combination, if a TCI field in the DCI corresponds to at least two TCI states, at least two Values corresponding to that first parameter combination correspond to the same mapping relationship between the TCI states and the CDM groups.

In one embodiment, at least one second parameter combination is formed by a DMRS pilot type, a maximum number of front-load DMRS symbols being 2, the number of actually used DMRS symbols, the number of the CDM groups without data and the total number of DMRS ports. For each second parameter combination, if a TCI field in the DCI corresponds to at least two TCI states, at least two Values corresponding to that second parameter combination correspond to the same mapping relationship between the TCI states and the CDM groups.

In one embodiment, in the at least two Values corresponding to each first parameter combination, if the Values are different, correspondences between the quantities of the DMRS ports contained in the CDM groups and the CDM groups are different; and/or, in the at least two Values corresponding to each second parameter combination, if the Values are different, correspondences between the quantities of the DMRS ports contained in the CDM groups and the CDM groups are different.

In one embodiment, at least one first parameter combination is formed by a DMRS pilot type, a maximum number of front-load DMRS symbols being 1, the number of the CDM groups without data and the total number of DMRS ports. For each first parameter combination, if a TCI field in the DCI corresponds to at least two TCI states, the mapping relationships, corresponding to the at least two Values corresponding to that first parameter combination, between the TCI states and the CDM groups are different.

In one embodiment, at least one second parameter combination is formed by a DMRS pilot type, a maximum number of front-load DMRS symbols being 2, the number of actually used DMRS symbols, the number of the CDM groups without data and the total number of DMRS ports. For each second parameter combination, if a TCI field in the DCI corresponds to at least two TCI states, the mapping relationships, corresponding to the at least two Values corresponding to that first parameter combination, between the TCI states and the CDM groups are different.

In one embodiment, port numbers corresponding to the Values corresponding to each first parameter combination are the same; and/or, port numbers corresponding to the Values corresponding to each second parameter combination are the same.

An embodiment of the present application further provides a computer-readable non-volatile storage medium, including program codes. When the program codes run on a computing terminal, the program codes are configured to enable the computing terminal to execute the steps of the transmission configuration indication method of the DMRS port of the embodiments of the present application.

The present application is described above with reference to block diagrams and/or flow diagrams of methods, apparatuses (systems) and/or computer program products according to the embodiments of the present application. It should be understood that a block of the block diagrams and/or flow diagrams and a combination of blocks of the block diagrams and/or the flow diagrams can be implemented by computer program instructions. These computer program instructions may be provided for a processor of a general-purpose computer and a special-purpose computer and/or other programmable data processing apparatuses to produce a machine, so that instructions executed by the processor of the computer and/or other programmable data processing apparatuses create a method for implementing a function/action specified in blocks of the block diagrams and/or flow diagrams.

Correspondingly, the present application may be further implemented through hardware and/or software (including firmware, resident software, microcodes, etc.). Further, the present application may take the form of a computer program product on a computer usable or computer readable storage medium having computer usable or computer readable program codes implemented in the medium for use by or in combination with an instruction execution system. In the context of the present application, a computer usable or computer-readable medium may be any medium that may contain, store, communicate, transmit, or convey a program for use by, or in combination with, an instruction execution system, apparatus, or device.

What is claimed is:

1. A transmission configuration indication method of a demodulation reference signal (DMRS) port, comprising:

configuring, by a network side device, at least two DMRS ports for a terminal according to a required mapping relationship between transmission configuration indication state information (TCI states) and DMRS code division multiplexing (CDM) groups, wherein the at least two DMRS ports belong to different DMRS CDM groups, and the different DMRS CDM groups comprise different quantities of DMRS ports; and sending, by the network side device, downlink control information (DCI) to the terminal, wherein the DCI comprises DMRS port index values, the DMRS port index values are index values pre-defined in a DMRS port allocation table, and the DMRS port index values are used to indicate a set of the at least two DMRS ports configured to the terminal, a number of DMRS CDM groups without data, and a number of front-load DMRS symbols, and are used to indicate the mapping relationship between the TCI states and the DMRS CDM groups.

2. The method according to claim 1, wherein at least one first parameter combination is formed by a DMRS pilot type, a maximum number of front-load DMRS symbols being 1, the number of the DMRS CDM groups without data and a total number of DMRS ports; and for each of the at least one first parameter combination, if a TCI field in the DCI corresponds to at least two TCI states, at least two DMRS port index values corresponding to the first parameter combination correspond to a same mapping relationship between the ICI states and the DMRS CDM groups; or at least one second parameter combination is formed by a DMRS pilot type, a maximum number of front-load DMRS symbols being 2, a number of actually used DMRS symbols, the number of the DMRS CDM groups without data and a total number of DMRS ports; and for each of the at least one second parameter combination, if a TCI field in the DCI corresponds to at least two TCI states, at least two DMRS port index values corresponding to the second parameter combination correspond to a same mapping relationship between the TO states and the DMRS CDM groups.

3. The method according to claim 2, wherein in the at least two DMRS port index values corresponding to each of the at least one first parameter combination, if the DMRS port index values are different, correspondences between the quantities of DMRS ports contained in the DMRS CDM groups and the DMRS CDM groups are different; and/or in the at least two DMRS port index values corresponding to each of the at least one second parameter combination, if the DMRS port index values are different, correspondences between the quantities of DMRS ports contained in the DMRS CDM groups and the DMRS CDM groups are different.

4. The method according to claim 1, wherein at least one first parameter combination is formed by a DMRS pilot type, a maximum number of front-load DMRS symbols being 1, the number of the DMRS CDM groups without data and a total number of DMRS ports; and for each of the at least one first parameter combination, if a TCI field in the DCI corresponds to at least two TCI states, mapping relationships, corresponding to at least two DMRS port index values corresponding to that first parameter combination, between the TCI states and the CDM groups are different; or at least one second parameter combination is formed by a DMRS pilot type, a maximum number of front-load DMRS symbols being 2, the number of actually used DMRS symbols, the number of the DMRS CDM groups without data and a total number of DMRS ports; and for each of the at least one second parameter combination, if a TCI field in the DCI corresponds to at least two TCI states, mapping relationships, corresponding to at least two DMRS port index values corresponding to that second parameter combination, between the TCI states and the CDM groups are different.

5. The method according to claim 4, wherein port numbers corresponding to the DMRS port index values corresponding to each of the at least one first parameter combination are the same; and/or, port numbers corresponding to the DMRS port index values corresponding to each of the at least one second parameter combination are the same.

6. A transmission configuration indication method of a demodulation reference signal (DMRS) port, comprising:

receiving, by a terminal, downlink control information (DCI) sent by a network side device, wherein the DCI comprises DMRS port index values, and the DMRS port index values are index values pre-defined in a DMRS port allocation table; and determining, by the terminal, a set of DMRS ports, a number of DMRS code division multiplexing (CDM) groups without data, a number of front-load DMRS symbols and a mapping relationship between transmission configuration indication state information (TCI states) and DMRS CDM groups configured by the network side device to the terminal according to the DMRS port index values and the port allocation table, wherein at least two DMRS ports comprised in the set of DMRS ports belong to different DMRS CDM groups, the different DMRS CDM groups comprise different quantities of DMRS ports, and the at least two DMRS ports are determined by the network side device according to a required mapping relationship between the TCI states and the DMRS CDM groups.

7. The method according to claim 6, wherein at least one first parameter combination is formed by a DMRS pilot type, a maximum number of front-load DMRS symbols being 1, the number of the DMRS CDM groups without data and a total number of DMRS ports; and for each of the at least one first parameter combination, if a TCI field in the DCI corresponds to at least two TCI states, at least two DMRS port index values corresponding to the first parameter combination correspond to a same mapping relationship between the TCI states and the DMRS CDM groups; or at least one second parameter combination is formed by a DMRS pilot type, a maximum number of front-load DMRS symbols being 2, a number of actually used DMRS symbols, the number of the DMRS CDM groups without data and a total number of DMRS ports; and for each of the at least one second parameter combination, if a TCI field in the DCI corresponds to at least two TCI states, at least two DMRS port index values corresponding to the second parameter combination correspond to a same mapping relationship between the TCI states and the DMRS CDM groups.

8. The method according to claim 7, wherein in the at least two DMRS port index values corresponding to each of the at least one first parameter combination, if the DMRS port index values are different, correspondences between the quantities of DMRS ports contained in the DMRS CDM groups and the DMRS CDM groups are different; and/or in the at least two DMRS port index values corresponding to each of the at least one second parameter combination, if the DMRS port index values are different, correspondences between the quantities of DMRS ports contained in the DMRS CDM groups and the DMRS CDM groups are different.

9. The method according to claim 6, wherein at least one first parameter combination is formed by a DMRS pilot type, a maximum number of front-load DMRS symbols being 1, the number of the DMRS CDM groups without data and a total number of DMRS ports; and
  for each of the at least one first parameter combination, if a TCI field in the DCI corresponds to at least two TCI states, mapping relationships, corresponding to at least two DMRS port index values corresponding to that first parameter combination, between the TCI states and the CDM groups are different; or
  at least one second parameter combination is formed by a DMRS pilot type, a maximum number of front-load DMRS symbols being 2, the number of actually used DMRS symbols, the number of the DMRS CDM groups without data and a total number of DMRS ports; and
  for each of the at least one second parameter combination, if a TCI field in the DCI corresponds to at least two TCI states, mapping relationships, corresponding to at least two DMRS port index values corresponding to that second parameter combination, between the TCI states and the CDM groups are different.

10. The method according to claim 9, wherein port numbers corresponding to the DMRS port index values corresponding to each of the at least one first parameter combination are the same; and/or, port numbers corresponding to the DMRS port index values corresponding to each of the at least one second parameter combination are the same.

11. A communication apparatus, comprising: a processor, a memory and a transceiver; wherein
  the transceiver is controlled by the processor to receive and send information;
  the memory stores computer instructions; and
  the processor is configured to read the computer instructions in the memory to:
  configure at least two DMRS ports for a terminal according to a required mapping relationship between transmission configuration indication state information (TCI states) and DMRS code division multiplexing (CDM) groups, wherein the at least two DMRS ports belong to different DMRS CDM groups, and the different DMRS CDM groups comprise different quantities of DMRS ports; and
  send downlink control information (DCI) to the terminal, wherein the DCI comprises DMRS port index values, the DMRS port index values are index values predefined in a DMRS port allocation table, and the DMRS port index values are used to indicate a set of the at least two DMRS ports configured to the terminal, a number of DMRS CDM groups without data, and a number of front-load DMRS symbols, and are used to indicate the mapping relationship between the TCI states and the DMRS CDM groups.

12. The communication apparatus according to claim 11, wherein at least one first parameter combination is formed by a DMRS pilot type, a maximum number of front-load DMRS symbols being 1, the number of the DMRS CDM groups without data and a total number of DMRS ports; and
  for each of the at least one first parameter combination, if a TCI field in the DCI corresponds to at least two TCI states, at least two DMRS port index values corresponding to the first parameter combination correspond to a same mapping relationship between the TCI states and the DMRS CDM groups; or
  at least one second parameter combination is formed by a DMRS pilot type, a maximum number of front-load DMRS symbols being 2, a number of actually used DMRS symbols, the number of the DMRS CDM groups without data and a total number of DMRS ports; and
  for each of the at least one second parameter combination, if a TCI field in the DCI corresponds to at least two TCI states, at least two DMRS port index values corresponding to the second parameter combination correspond to a same mapping relationship between the TCI states and the DMRS CDM groups.

13. The communication apparatus according to claim 12, wherein in the at least two DMRS port index values corresponding to each of the at least one first parameter combination, if the DMRS port index values are different, correspondences between the quantities of DMRS ports contained in the DMRS CDM groups and the DMRS CDM groups are different; and/or
  in the at least two DMRS port index values corresponding to each of the at least one second parameter combination, if the DMRS port index values are different, correspondences between the quantities of DMRS ports contained in the DMRS CDM groups and the DMRS CDM groups are different.

14. The communication apparatus according to claim 11, wherein at least one first parameter combination is formed by a DMRS pilot type, a maximum number of front-load DMRS symbols being 1, the number of the DMRS CDM groups without data and a total number of DMRS ports; and
  for each of the at least one first parameter combination, if a TCI field in the DCI corresponds to at least two TCI states, mapping relationships, corresponding to at least two DMRS port index values corresponding to that first parameter combination, between the TCI states and the CDM groups are different;
  at least one second parameter combination is formed by a DMRS pilot type, a maximum number of front-load DMRS symbols being 2, the number of actually used DMRS symbols, the number of the DMRS CDM groups without data and a total number of DMRS ports; and
  for each of the at least one second parameter combination, if a TCI field in the DCI corresponds to at least two TCI states, mapping relationships, corresponding to at least two DMRS port index values corresponding to that second parameter combination, between the TCI states and the CDM groups are different.

15. The communication apparatus according to claim 14, wherein port numbers corresponding to the DMRS port index values corresponding to each of the at least one first parameter combination are the same; and/or, port numbers corresponding to the DMRS port index values corresponding to each of the at least one second parameter combination are the same.

16. A communication apparatus, comprising: a processor, a memory and a transceiver; wherein
  the transceiver is controlled by the processor to receive and send information;
  the memory stores computer instructions; and
  the processor is configured to perform the method according to claim 6.

17. The communication apparatus according to claim 16, wherein at least one first parameter combination is formed by a DMRS pilot type, a maximum number of front-load DMRS symbols being 1, the number of the DMRS CDM groups without data and a total number of DMRS ports; and for each of the at least one first parameter combination, if a TCI field in the DCI corresponds to at least two TCI states, at least two DMRS port index values corresponding to the first parameter combination correspond to a same mapping relationship between the TCI states and the DMRS CDM groups; or at least one second parameter combination is formed by a DMRS pilot type, a maximum number of front-load DMRS symbols being 2, a number of actually used DMRS symbols, the number of the DMRS CDM groups without data and a total number of DMRS ports; and for each of the at least one second parameter combination, if a TCI field in the DCI corresponds to at least two TCI states, at least two DMRS port index values corresponding to the second parameter combination correspond to a same mapping relationship between the TCI states and the DMRS CDM groups.

18. The communication apparatus according to claim 17, wherein in the at least two DMRS port index values corresponding to each of the at least one first parameter combination, if the DMRS port index values are different, correspondences between the quantities of DMRS ports contained in the DMRS CDM groups and the DMRS CDM groups are different; and/or in the at least two Values corresponding to each of the at least one second parameter combination, if the DMRS port index values are different, correspondences between the quantities of DMRS ports contained in the DMRS CDM groups and the DMRS CDM groups are different.

19. The communication apparatus according to claim 16, wherein at least one first parameter combination is formed by a DMRS pilot type, a maximum number of front-load DMRS symbols being 1, the number of the DMRS CDM groups without data and a total number of DMRS ports; and for each of the at least one first parameter combination, if a TCI field in the DCI corresponds to at least two TCI states, mapping relationships, corresponding to at least two DMRS port index values corresponding to that first parameter combination, between the TCI states and the CDM groups are different; or at least one second parameter combination is formed by a DMRS pilot type, a maximum number of front-load DMRS symbols being 2, the number of actually used DMRS symbols, the number of the DMRS CDM groups without data and a total number of DMRS ports; and for each of the at least one second parameter combination, if a TCI field in the DCI corresponds to at least two TCI states, mapping relationships, corresponding to at least two DMRS port index values corresponding to that second parameter combination, between the TCI states and the CDM groups are different.

20. The communication apparatus according to claim 19, wherein port numbers corresponding to the DMRS port index values corresponding to each of the at least one first parameter combination are the same; and/or, port numbers corresponding to the DMRS port index values corresponding to each of the at least one second parameter combination are the same.

\* \* \* \* \*